(12) United States Patent
Wang et al.

(10) Patent No.: US 11,333,930 B2
(45) Date of Patent: May 17, 2022

(54) LIQUID CRYSTAL DISPLAY PANEL AND DISPLAY DEVICE

(71) Applicant: Tianma Micro-Electronics Co., Ltd., Shenzhen (CN)

(72) Inventors: Yuanying Wang, Shanghai (CN); Jun Zhou, Shanghai (CN)

(73) Assignee: TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/218,708

(22) Filed: Mar. 31, 2021

(65) Prior Publication Data
US 2021/0215979 A1 Jul. 15, 2021

(30) Foreign Application Priority Data
Dec. 30, 2020 (CN) .......................... 202011614186.1

(51) Int. Cl.
*G02F 1/13363* (2006.01)
*G02F 1/1335* (2006.01)

(52) U.S. Cl.
CPC .. *G02F 1/133631* (2021.01); *G02F 1/133531* (2021.01); *G02F 1/133638* (2021.01); *G02F 2413/04* (2013.01); *G02F 2413/07* (2013.01)

(58) Field of Classification Search
None
See application file for complete search history.

(56) References Cited

U.S. PATENT DOCUMENTS

| | | | |
|---|---|---|---|
| 2005/0146659 A1* | 7/2005 | Ishii | G02F 1/1393 349/117 |
| 2009/0161044 A1* | 6/2009 | Ge | G02F 1/133555 349/98 |
| 2009/0290108 A1* | 11/2009 | Nakagawa | G02B 27/145 349/118 |
| 2020/0257166 A1* | 8/2020 | Smith | G02F 1/1368 |
| 2021/0088854 A1* | 3/2021 | Shin | G02F 1/13363 |
| 2021/0223634 A1* | 7/2021 | Zhou | G02F 1/133531 |

FOREIGN PATENT DOCUMENTS

| | | |
|---|---|---|
| CN | 101539685 A | 9/2009 |
| CN | 111033370 A | 4/2020 |

* cited by examiner

*Primary Examiner* — Ryan Crockett
(74) *Attorney, Agent, or Firm* — Christensen O'Connor Johnson Kindness PLLC

(57) ABSTRACT

A liquid crystal display panel is described. In an embodiment, the liquid crystal display panel includes: a first substrate; a second substrate; a liquid crystal layer; a first linear polarizer disposed at a side of the first substrate away from the liquid crystal layer; a first quarter-wave plate disposed between the first substrate and the first linear polarizer, where an angle between a slow axis of the first quarter-wave plate and an absorption axis of the first linear polarizer is 45° or 135°; a first retardation film disposed between the liquid crystal layer and the first quarter-wave plate; a second quarter-wave plate disposed between the liquid crystal layer and the first substrate, where slow axes of the first and second quarter-wave plates are perpendicular; and a second linear polarizer disposed at a side of the second substrate away from the liquid crystal layer, where absorption axes of the first and second linear polarizers are perpendicular.

18 Claims, 14 Drawing Sheets

| | |
|---|---|
| First linear polarizer | 41 |
| First quarter-wave plate | 11 |
| Second retardation film | 52 |
| First retardation film | 51 |
| First substrate | 10 |
| Second quarter-wave plate | 12 |
| Liquid crystal layer | 30 |
| Second substrate | 20 |
| Second linear polarizer | 42 |
| Backlight | 6 |

| First linear polarizer | ~ 41 |
| --- | --- |
| First quarter-wave plate | ~ 11 |
| First retardation film | ~ 51 |
| First substrate | ~ 10 |
| Second quarter-wave plate | ~ 12 |
| Liquid crystal layer | ~ 30 |
| Second substrate | ~ 20 |
| Second linear polarizer | ~ 42 |
| Backlight | ~ 6 |

| First linear polarizer | ~ 41 |
| --- | --- |
| First quarter-wave plate | ~ 11 |
| Second retardation film | ~ 52 |
| First retardation film | ~ 51 |
| First substrate | ~ 10 |
| Second quarter-wave plate | ~ 12 |
| Liquid crystal layer | ~ 30 |
| Second substrate | ~ 20 |
| Second linear polarizer | ~ 42 |
| Backlight | ~ 6 |

| | |
|---|---|
| First linear polarizer | 41 |
| Third retardation film | 53 |
| First quarter-wave plate | 11 |
| Second retardation film | 52 |
| First retardation film | 51 |
| First substrate | 10 |
| Second quarter-wave plate | 12 |
| Liquid crystal layer | 30 |
| Second substrate | 20 |
| Second linear polarizer | 42 |
| Backlight | 6 |

| | |
|---|---|
| First linear polarizer | ~ 41 |
| Fourth retardation film | ~ 54 |
| Third retardation film | ~ 53 |
| First quarter-wave plate | ~ 11 |
| Second retardation film | ~ 52 |
| First retardation film | ~ 51 |
| First substrate | ~ 10 |
| Second quarter-wave plate | ~ 12 |
| Liquid crystal layer | ~ 30 |
| Second substrate | ~ 20 |
| Second linear polarizer | ~ 42 |
| Backlight | ~ 6 |

| | |
|---|---|
| First linear polarizer | ~ 41 |
| First quarter-wave plate | ~ 11 |
| Second retardation film | ~ 52 |
| First retardation film | ~ 51 |
| First substrate | ~ 10 |
| Second quarter-wave plate | ~ 12 |
| Liquid crystal layer | ~ 30 |
| Second substrate | ~ 20 |
| Third retardation film | ~ 53 |
| Second linear polarizer | ~ 42 |
| Backlight | ~ 6 |

| | |
|---|---|
| First linear polarizer | 41 |
| First quarter-wave plate | 11 |
| Second retardation film | 52 |
| First retardation film | 51 |
| First substrate | 10 |
| Second quarter-wave plate | 12 |
| Liquid crystal layer | 30 |
| Second substrate | 20 |
| Fourth retardation film | 54 |
| Third retardation film | 53 |
| Second linear polarizer | 42 |
| Backlight | 6 |

# LIQUID CRYSTAL DISPLAY PANEL AND DISPLAY DEVICE

CROSS-REFERENCE TO RELATED APPLICATIONS

The present disclosure claims priority to Chinese Patent Application No. 202011614186.1, filed on Dec. 30, 2020, the content of which is incorporated herein by reference in its entirety.

TECHNICAL FIELD

The present disclosure relates to the field of display technologies and, more particularly, to a liquid crystal display panel and a display device.

BACKGROUND

Liquid crystal display (LCD) panels have been widely used in fields such as mobile phones, televisions, digital cameras, and on-board monitors due to their fast response, low cost, no radiation, soft image, and thinness.

Currently, a research focus lies in an increase of a contrast of the liquid crystal display panel at a large visual angle.

SUMMARY

In view of this, a liquid crystal display panel and a display device are provided according to embodiments of the present disclosure, to increase the contrast of the liquid crystal display panel at a large visual angle.

In an aspect, a liquid crystal display panel is provided according to an embodiment of the present disclosure. In an embodiment, the liquid crystal display includes: a first substrate; a second substrate opposite to the first substrate; a liquid crystal layer disposed between the first substrate and the second substrate; a first linear polarizer disposed at a side of the first substrate facing away from the liquid crystal layer; a first quarter-wave plate disposed between the first substrate and the first linear polarizer, an angle between a slow axis of the first quarter-wave plate and an absorption axis of the first linear polarizer being 45° or 135°; a first retardation film disposed between the liquid crystal layer and the first quarter-wave plate; a second quarter-wave plate disposed between the liquid crystal layer and the first substrate, where a slow axis of the second quarter-wave plate is perpendicular to the slow axis of the first quarter-wave plate; and a second linear polarizer disposed at a side of the second substrate facing away from the liquid crystal layer, where an absorption axis of the second linear polarizer is perpendicular to the absorption axis of the first linear polarizer.

In another aspect, a display device is provided according to an embodiment of the present disclosure. In an embodiment, the display device includes the liquid crystal display panel described above.

BRIEF DESCRIPTION OF DRAWINGS

In order to explain the technical solutions of the embodiments of the present disclosure, the drawings used in the description of the embodiments will be simply introduced in the following. The drawings in the following description are only some of the embodiments of the present disclosure. For those of ordinary skill in the art, other drawings can be obtained based on these drawings without any inventive efforts.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are only for the purpose of describing the specific embodiments, rather than limiting the present disclosure. The singular forms of "a", "an" and "the" used in the embodiments of the present disclosure and the attached claims are intended to include plural forms as well, unless represented otherwise explicitly in the context.

It should be understood that the term "and/or" used herein is merely an association relationship describing associated objects, indicating that there may be three relationships, for example, A and/or B may represent that three cases, i.e., A existing individually, A and B existing simultaneously, B existing individually. In addition, the character "/" herein generally represents that the related objects before and after the character form an "or" relationship.

It should be understood that, although a quarter-wave plate may be described using the terms of "first", "second", "third", etc., in the embodiments of the present disclosure, the quarter-wave plate will not be limited to these terms. These terms are merely used to distinguish quarter-wave plates from one another. For example, without departing from the scope of the embodiments of the present disclosure, a first quarter-wave plate may also be referred to as a second quarter-wave plate, and similarly a second quarter-wave plate may also be referred to as a first quarter-wave plate.

In an implementation process of the embodiments of the present disclosure, the inventors found that it is difficult for the liquid crystal display panel to have a large contrast at multiple visual angles due to optical anisotropy of the optical film layer in the liquid crystal display panel and a difference in optical path length when light propagates in different directions.

Figures 1, 2:
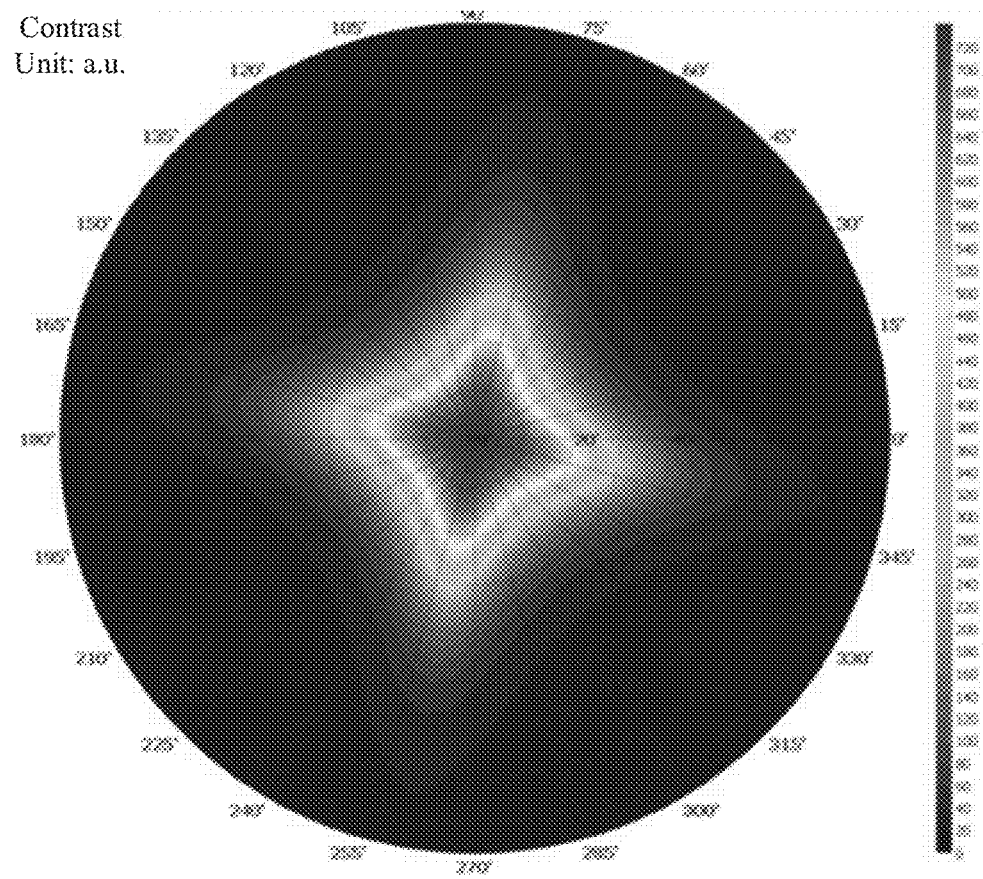
FIG. 1 is a schematic diagram of a conventional liquid crystal display panel.
FIG. 2 is a simulation effect diagram of contrasts of the liquid crystal display panel shown in FIG. 1 at different visual angles.

FIG. 1 is a schematic diagram of a conventional liquid crystal display panel. As shown in FIG. 1, the liquid crystal display panel includes a first substrate 10'; a second substrate 20' opposite to the first substrate 10'; a liquid crystal layer 30' disposed between the first substrate 10' and the second substrates 20'; a first linear polarizer 41'; a second linear polarizer 42', where an absorption axis of the first linear polarizer 41' is orthogonal to an absorption axis of the second linear polarizer 42; a first quarter-wave plate 11'; and a second quarter-wave plate 12', where a slow axis of the first quarter-wave plate 11' is orthogonal to a slow axis of the second quarter-wave plate 12'. FIG. 2 is a simulation effect diagram of contrasts of the liquid crystal display panel shown in FIG. 1 at different visual angles. It can be seen that the liquid crystal display panel has a very low contrast at a large visual angle and poor visual angle characteristics.

Figure 3:
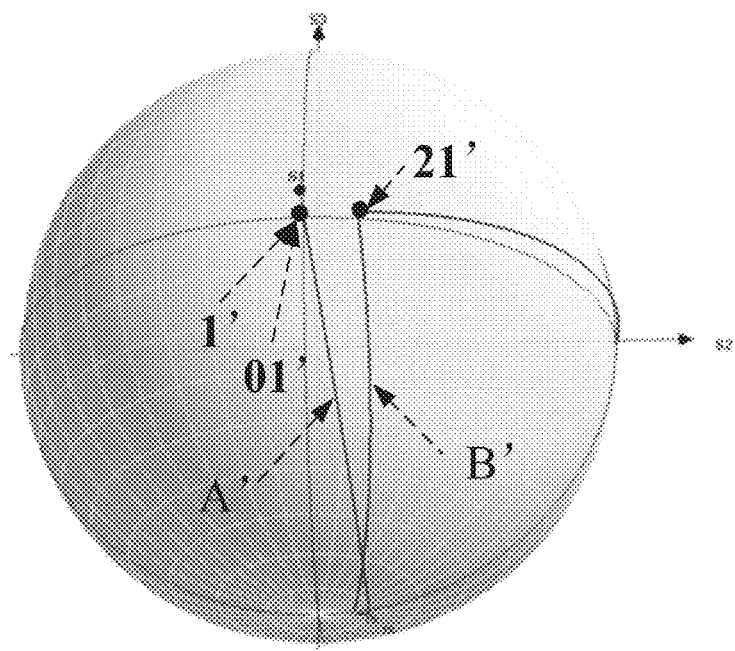
FIG. 3 is a diagram of a Poincaré sphere for the liquid crystal display panel shown in FIG. 1 observed at a visual angle of (45°, 0°) in a black state.
Figure 4:
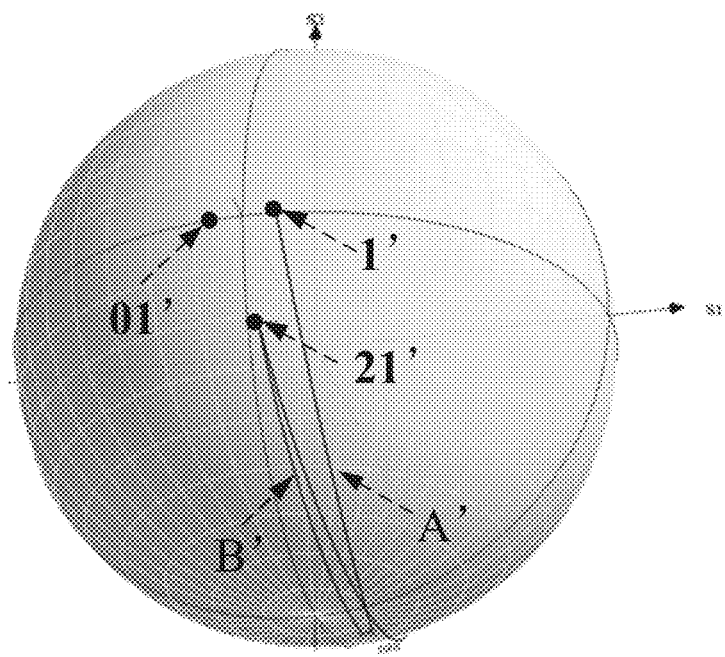
FIG. 4 is a diagram of a Poincare sphere for the liquid crystal display panel shown in FIG. 1 observed at a visual angle of (45°, 45°) in a black state.

Analysis is made in combination with a Poincare sphere for representing a polarization state of light, as shown in FIG. 3 and FIG. 4. FIG. 3 is a diagram of a Poincare sphere for the liquid crystal display panel shown in FIG. 1 observed at a visual angle of (45°, 0°) in a black state; and FIG. 4 is a diagram of a Poincare sphere for the liquid crystal display panel shown in FIG. 1 observed at a visual angle of (45°, 45°) in a black state. In FIG. 3 and FIG. 4, a point 1' represents a polarization state of light emitted from the backlight 6' after passing through the second linear polarizer 42'. A curve A' represents a change trajectory of a polarization state of light passing through the second quarter-wave plate 12'. A curve B' represents a change trajectory of a polarization state of light passing through the first quarter-wave plate 11'. A point 21' represents a polarization state of light after passing through the first quarter-wave plate 11'. A point 01' represents a polarization state of light that can be absorbed by the first linear polarizer 41', that is, a theoretically optimal point in a case of a black state and no light leakage.

At the visual angle (45°, 0°), the slow axis of the first quarter-wave plate 11' is no longer orthogonal to the slow axis of the second quarter-wave plate 12'. At the visual angle (45°, 45°), a retardation of the first quarter-wave plate 11' is no longer equal to a retardation of the second quarter-wave plate 12'. Therefore, the point 1' shown in FIG. 3 and the point 1' shown in FIG. 4 have different coordinates, and the point 21' shown in FIG. 3 and the point 21' shown in FIG. 4 have different coordinates. Moreover, since an angle between the first linear polarizer 41' and the second linear polarizer 42' at the visual angle (45°, 0°) is not equal to that at the visual angle (45°, 45°), the point 01' shown in FIG. 3 and the point 01' shown in FIG. 4 have different coordinates. It can be seen that, at the visual angle (45°, 0°) and the visual angle (45°, 45°), the light emitted from the first quarter-wave plate 11' is elliptically polarized light. Subsequently, the elliptically polarized light cannot be completely absorbed by the first linear polarizer 41'. Moreover, in each of FIG. 3 and FIG. 4, there is a relatively larger distance between the point 21' and the theoretical optimal point 01'. Therefore, at both visual angles, there is a problem of light leakage in a black state, and the contrast is relatively low. It can be seen in combination with FIG. 2 that the liquid crystal display panel with a structure shown in FIG. 1 has a poor contrast other visual angles, such as a visual angle (45°, 135°), a visual angle (45°, 225°), and a visual angle (45°, 315°).

Figures 5, 6:
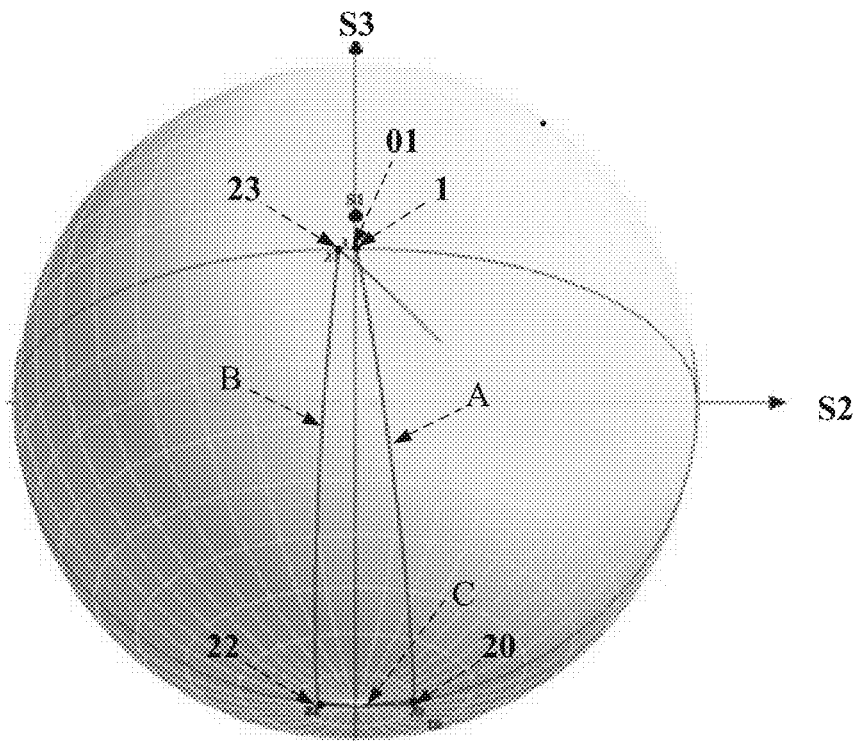
FIG. 5 is a schematic cross-sectional view of a liquid crystal display panel according to an embodiment of the present disclosure.
FIG. 6 is a diagram of a Poincare sphere for the liquid crystal display panel shown in FIG. 5 observed at a visual angle of (45°, 0°) in a black state according to an embodiment of the present disclosure.

In view of this, a liquid crystal display panel is provided according to an embodiment of the present disclosure, as shown in FIG. 5. FIG. 5 is a schematic cross-sectional view of a liquid crystal display panel according to an embodiment of the present disclosure. The liquid crystal display panel includes a first substrate 10, a second substrate 20 opposite to the first substrate 10, and a liquid crystal layer 30 disposed between the first substrate 10 and the second substrate 20. In an example, the first substrate 10 may be a color film substrate, including color resists of different colors. The second substrate 20 may be an array substrate, including thin film transistors, pixel electrodes, and various signal lines such as scan lines and data lines.

As shown in FIG. 5, the liquid crystal display panel further includes a first linear polarizer 41, a second linear polarizer 42, a first quarter-wave plate 11, a second quarter-wave plate 12, and a first retardation film 51.

Herein, the first linear polarizer 41 is disposed at a side of the first substrate 10 facing away from the liquid crystal layer 30. The second linear polarizer 42 is disposed at a side of the second substrate 20 facing away from the liquid crystal layer 30. An absorption axis of the second linear polarizer 42 is perpendicular to an absorption axis of the first linear polarizer 41. When a backlight module including a backlight 6 is subsequently set, the backlight module can be placed at a side of the second linear polarizer 42 facing away from the first linear polarizer 41.

In an embodiment of the present disclosure, the first quarter-wave plate 11 is disposed between the first substrate 10 and the first linear polarizer 41. An angle between the slow axis of the first quarter-wave plate 11 and the absorption axis of the first linear polarizer 41 is 45° or 135°.

In an embodiment of the present disclosure, a first retardation film 51 is further provided between the liquid crystal layer 30 and the first quarter-wave plate 11, to alleviate the problem of light leakage of the liquid crystal display panel in a black state at a large visual angle. Herein, the visual angle is represented by (θ, φ), where θ represents an angle between the visual angle direction and the normal line of the liquid crystal display panel, and φ represents an angle between an orthographic projection of the visual angle direction in a plane of the liquid crystal display panel and a reference direction in the plane of the crystal display panel. Herein, (0°, 0°) represents a front visual angle, and any other visual angles are large visual angles.

In an embodiment of the present disclosure, the problem of light leakage in the black state at a large visual angle can be compensated by providing the first retardation film 51. The above problem results from that the slow axis of the first quarter-wave plate 11 is no longer perpendicular to the slow axis of the second quarter-wave plate 12 or the retardation of the first quarter-wave plate 11 is no longer equal to the retardation of the second quarter-wave plate 12, at a large visual angle. Thus, a brightness of the liquid crystal display panel at a large visual angle in the black state is reduced, thereby ensuring a high contract of the liquid crystal display panel at a large visual angle and increasing a visual angle range of the liquid crystal display panel. In an example, the liquid crystal display panel provided by this embodiment of the present disclosure can be applied to an on-board monitor, so as to increase the visual angle of the car displayer.

In an example, as shown in FIG. 5, in an embodiment of the present disclosure, the first retardation film 51 may be disposed between the first quarter-wave plate 11 and the second quarter-wave plate 12.

In the following, taking the visual angle (45°, 0°) and the visual angle (45°, 45°) as examples, a function of the first retardation film 51 will be described in combination with the Poincare sphere representing the polarization state of light. In the Poincare sphere, the polarization state of light can be presented by coordinates (S1, S2, S3) of a point on a sphere surface. Herein, S1 represents a coordinate of the point on an S1 axis, S2 represents a coordinate of the point on an S2 axis, and S3 represents a coordinate of the point on an S3 axis. In the Poincare sphere, points on the equator represent that the polarization state of the light is linearly polarized light, that is, S3=0; points at two poles represent that the polarization state of the light is circularly polarized light, that is, S1=0 and S2=0; and the other points on the sphere surface represent that the polarization state of the light is elliptically polarized light.

Figures 7, 8:
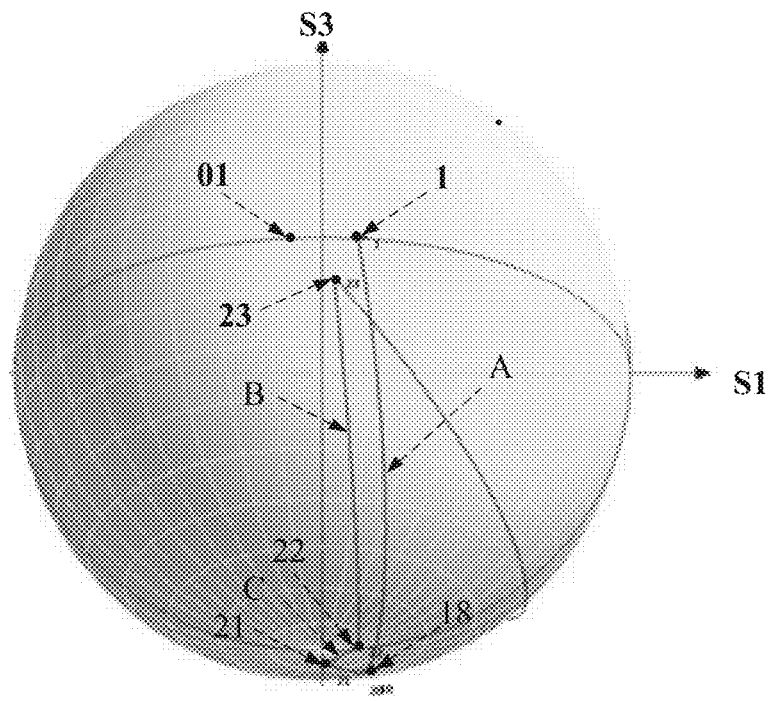
FIG. 7 is a diagram of a Poincare sphere for the liquid crystal display panel shown in FIG. 5 observed at a visual angle of (45°, 45°) in a black state according to an embodiment of the present disclosure.
FIG. 8 is a schematic cross-sectional view of another liquid crystal display panel according to an embodiment of the present disclosure.

FIG. 6 is a diagram of a Poincare sphere for the liquid crystal display panel shown in FIG. 5 observed at a visual angle of (45°, 0°) in a black state. FIG. 7 is a diagram of a Poincare sphere for the liquid crystal display panel shown in FIG. 5 observed at a visual angle of (45°, 45°) in a black state. As shown in FIG. 6 and FIG. 7, a point 1 represents the polarization state of light emitted from the backlight 6 after passing through the second linear polarizer 42. A curve A represents a change trajectory of the polarization state of light passing through the second quarter-wave plate 12. A curve B represents a change trajectory of the polarization state of light passing through the first quarter-wave plate 11. A curve C represents a change trajectory of the polarization state of light passing through the first retardation film 51. A point 23 represents the polarization state of light after passing through the first quarter-wave plate 11. A point 01 represents the polarization state of light that can be absorbed by the first quarter-wave plate 41, that is, a theoretically optimal point. Since an angle between the first linear polarizer 41 and the second linear polarizer 42 at the visual angle (45°, 0°) is not equal to that at the visual angle (45°, 45°), the coordinates of the point 01 shown in FIG. 6 are different from the coordinates of the point 01 shown in FIG. 7. It can be seen by comparing FIG. 3 and FIG. 6 that the point 23 shown in FIG. 6 is closer to the theoretically optimal point 01. It can be seen by comparing FIG. 4 and FIG. 7 that at the visual angle (45°, 45°), the point 23 shown in FIG. 7 is closer to the theoretically optimal point 01. This means that the contrasts at visual angles (45°, 0°) and (45°, 45°) of the liquid crystal display panel can be increased by providing the first retardation film 51.

The above description takes the visual angle (45°, 0°) and the visual angle (45°, 45°) as an example to illustrate the function of the first retardation film 51. If the contrasts at these two visual angles are good, it can be expected that the contrasts at other visual angles are also good.

In an example, the liquid crystal display panel according to an embodiment of the present disclosure may operate an in-plane switching (IPS) display mode. In this mode, the liquid crystal molecules are oriented and rotated in a plane parallel to the liquid crystal display panel. For example, the IPS display mode includes: a vertical domain structure in which the orientation of the liquid crystal is parallel to a direction of the absorption axis of the second linear polarizer 42, and a horizontal domain structure in which the orientation of the liquid crystal is parallel to a direction of the absorption axis of the first linear polarizer 41.

On the basis of the above-described embodiments, in some embodiments, a vertical domain structure is adopted, that is, the orientation of the liquid crystal layer 30 is parallel to the direction of the absorption axis of the second linear polarizer 42. For example, FIG. 8 is a schematic cross-sectional view of another liquid crystal display panel according to an embodiment of the present disclosure. As shown in FIG. 8, the liquid crystal display panel further includes a second retardation film 52, which is disposed between the first quarter-wave plate 11 and the first retardation film 51. The contrast of the liquid crystal display panel at a large visual angle is increase and the visual angle of the liquid crystal display panel is enlarged by providing the second retardation film 52, to ensure a high contrast of the liquid crystal display panel at a visual angle when the liquid crystal display panel is observed vertically.

In an embodiment of the present disclosure, the slow axis of the first retardation film 51 is perpendicular to the slow axis of the second retardation film 52, and the retardation of the first retardation film 51 is equal to the retardation of the second retardation film 52, thereby ensuring a high contrast of the liquid crystal display panel at a front visual angle.

Figures 9, 10:
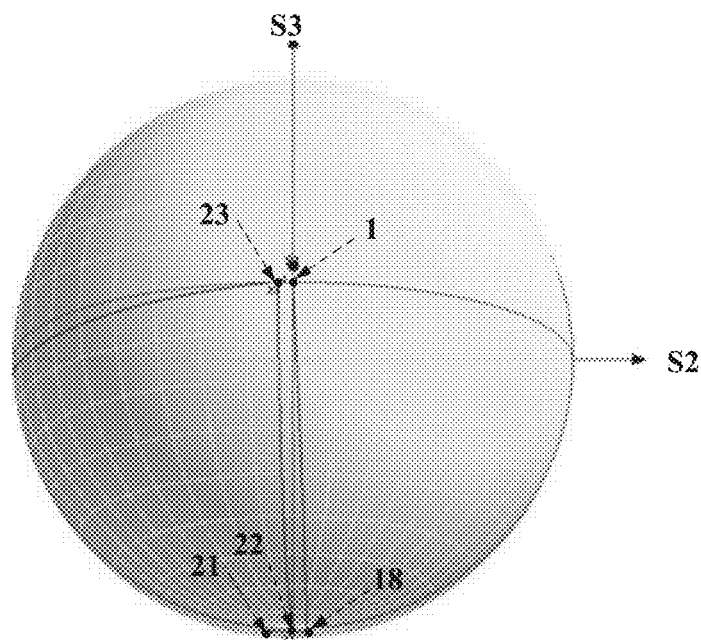
FIG. 9 is a diagram of a Poincare sphere for the liquid crystal display panel shown in FIG. 8 observed at a front visual angle in a black state according to an embodiment of the present disclosure.
FIG. 10 is a schematic cross-sectional view of still another liquid crystal display panel according to an embodiment of the present disclosure.

In an example, the first retardation film 51 and the second retardation film 52 are arranged between the first quarter-wave plate 11 and the second quarter-wave plate 12, as shown in FIG. 9. FIG. 9 is a diagram of a Poincaré sphere for the liquid crystal display panel shown in FIG. 8 observed at a front visual angle in a black state. In FIG. 9, a point 1 represents the polarization state of light emitted from the backlight 6 after passing through the second linear polarizer 42. A point 18 represents the polarization state of light emitted from the second quarter-wave plate 12. A point 21 represents the polarization state of light emitted from the first retardation film 51. A point 22 represents the polarization state of light emitted from the second retardation film 52. A point 23 represents the polarization state of light emitted from the first quarter-wave plate 11. It can be seen that after the light passes from the first retardation film 51, the polarization direction of the light deviates from the S3 axis. The arrangement of the second retardation film 52 can pull the polarization direction of the light back to a negative axis of S3, that is, make the light emitted from the second retardation film 52 circularly polarized light. Then, the light passes through the first quarter-wave plate 11 to become linearly polarized light, which can be subsequently absorbed by the first linear polarizer 41. That is, the arrangement of the first retardation film 51 and the second retardation film 52 can increase the contrast of the liquid crystal display panel at a large visual angle and enlarge the visual angle of the liquid crystal display panel, as well as ensuring a high contrast of the liquid crystal display panel at a visual angle when the liquid crystal display panel is observed vertically.

The liquid crystal display panel inevitably includes a material with a high reflectivity, such as a shielding electrode having a shielding function. Alternatively, due to different reflectivity of different film layers, light will be reflected when passing through an interface between film layers of the liquid crystal display panel, such as between a base substrate and a color filter and/or black matrix, or between a color filter and/or black matrix and optical glue. These film layers having a reflection function will reflect ambient light, and the reflected light will have an influence on emergent light of the liquid crystal display panel, thereby having an influence on the contrast of the liquid crystal display panel. In an embodiment of the present disclosure, the first quarter-wave plate 11 is provided between the first substrate 10 and the first linear polarizer 41, and the angle between the slow axis of the first quarter-wave plate 11 and the absorption axis of the first linear polarizer 41 is 45° or 135°, so as to decrease the reflectivity of the liquid crystal display panel.

In an example, in a process of ambient light irradiating the liquid crystal display panel, the ambient light will pass through the first linear polarizer 41, the first quarter-wave plate 11, the second retardation film 52 and the first retardation film 51, before reaching the above-mentioned film layers having a reflection function in the liquid crystal display panel. The light passes through the first linear polarizer 41 to become linearly polarized light, and the linearly polarized light then passes through the first quarter-wave plate 11 to become circularly polarized light. Based on the angle between the slow axis of the first quarter-wave plate 11 and the absorption axis of the first linear polarizer 41, the circularly polarized light may be left circularly polarized light or right circularly polarized light. Subsequently, the circularly polarized light passes through the second retardation film 52 and the first retardation film 51. Since the slow axes of the first retardation film 51 and the second retardation film 52 are perpendicular and the retardations of the first retardation film 51 and the second retardation film 52 are equal, a change of the polarization state of the light by the second retardation film 52 is just a reciprocal process of a change of the polarization state of the light by the first retardation film 51. This is expressed on the Poincaré sphere in that a trajectory after passing through the first retardation film 51 counteracts a trajectory after passing through the second retardation film 52. After passing through the second retardation film 52 and the first retardation film 51, the circularly polarized light has an unchanged rotation direction. Subsequently, the circularly polarized light is reflected and then passes through the first retardation film 51, the second retardation film 52, and the first quarter-wave plate 11 to become a linearly polarized light. The polarization direction of the linearly polarized light is parallel to the absorption axis of the first linear polarizer 41. Thus, after passing through the first linear polarizer 41, the linearly polarized light is absorbed by the first linear polarizer 41 and is not emitted out. In this way, reflected ambient light is not emitted from the liquid crystal display panel, so as to implement the liquid crystal display panel with an extremely low reflectivity.

As shown in FIG. 8, the second quarter-wave plate 12 is disposed between the liquid crystal layer 30 and the first substrate 10. That is, the second quarter-wave plate 12 is disposed in a liquid crystal cell. Taking an orientation shown in FIG. 8 as an example, the second quarter-wave plate 12 is disposed above the liquid crystal layer 30. That is, the first quarter-wave plate 11 and the second quarter-wave plate 12 are arranged at two sides of the above-mentioned film layer having a reflection function. In this way, the incident ambient light incident to the liquid crystal display panel is reflected before reaching the second quarter-wave plate 12, thereby avoiding a scenario where the incident ambient light incident upon the liquid crystal display panel passes through the second quarter-wave plate 12, as well as influencing formation of the circularly polarized light.

It should be noted that a positional relationship of the various film layers shown in FIG. 8 is merely for illustration. In an embodiment of the present disclosure, the first retardation film 51 and the second retardation film 52 are disposed between the first substrate 10 and the second quarter-wave plate 12. That is, the first retardation film 51 and the second retardation film 52 may be disposed in the liquid crystal cell. In this case, the liquid crystal display panel can still have an extremely low reflectivity.

Figure 11:
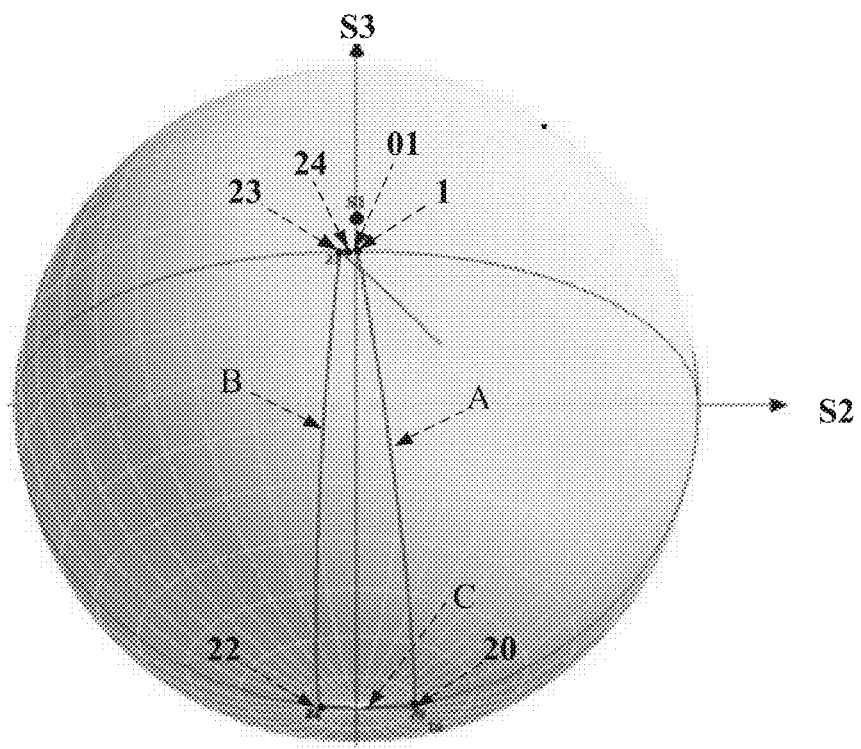
FIG. 11 is a diagram of a Poincare sphere for the liquid crystal display panel shown in FIG. 10 observed at a visual angle of (45°, 0°) in a black state according to an embodiment of the present disclosure.
Figure 12:
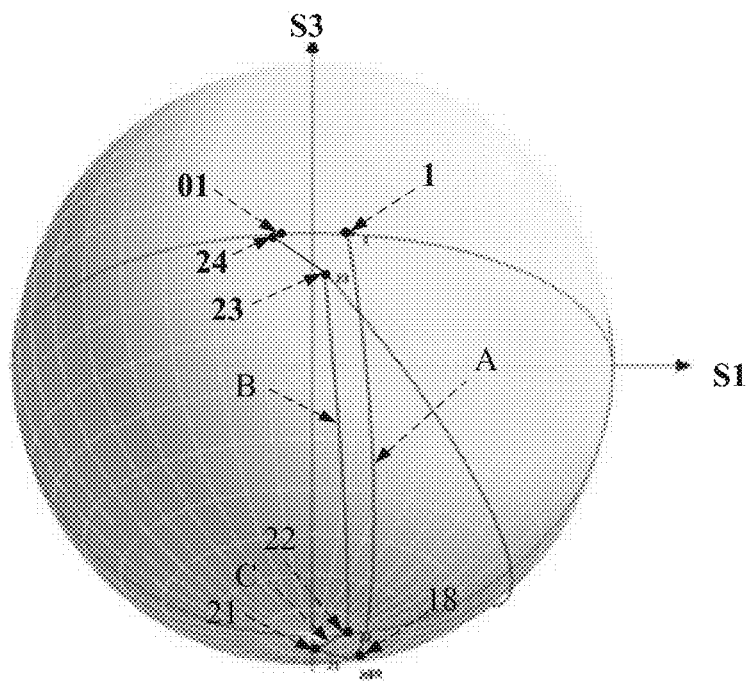
FIG. 12 is a diagram of a Poincare sphere for the liquid crystal display panel shown in FIG. 10 observed at a visual angle of (45°, 45°) in a black state according to an embodiment of the present disclosure.

FIG. 10 is a schematic cross-sectional view of still another liquid crystal display panel according to an embodiment of the present disclosure. As shown in FIG. 10, the liquid crystal display panel further includes a third retardation film 53, which is disposed between the first quarter-wave plate 11 and the first linear polarizer 41. A slow axis of the third retardation film 53 is perpendicular to or parallel to the absorption axis of the first linear polarizer 41. In this embodiment of the present disclosure, the arrangement of the third retardation film 53 can make the polarization state of the light reaching the first linear polarizer 41 closer to the direction of the absorption axis of the first linear polarizer 41 at a large visual angle. FIG. 11 is a diagram of a Poincare sphere for the liquid crystal display panel shown in FIG. 10 observed at a visual angle of (45°, 0°) in a black state. FIG. 12 is a diagram of a Poincare sphere for the liquid crystal display panel shown in FIG. 10 observed at a visual angle of (45°, 45°) in a black state. In FIG. 11 and FIG. 12, a point 1 represents the polarization state of the light emitted from the backlight 6 after passing through the second linear polarizer 42. A curve A represents a change trajectory of the polarization state of the light passing through the second quarter-wave plate 12. A curve B represents a change trajectory of the polarization state of the light passing through the first quarter-wave plate 11. A curve C represents a change trajectory of the polarization state of the light passing through the first retardation film 51. A point 23 represents a polarization state of the light emitted from the first quarter-wave plate 11. A point 24 represents the polarization state of the light emitted from the third retardation film 53. A point 01 represents the polarization state of the light that can be absorbed by the first linear polarizer 41, that is, a theoretically optimal point. It can be seen that in both FIG. 11 and FIG. 12, the point 24 is closer to the theoretically optimal point 01 than the point 23. This means that the contrast of the liquid crystal display panel can be further increased at a large visual angle by providing the third retardation film 53.

In addition, in this embodiment of the present disclosure, the slow axis of the third retardation film 53 is perpendicular to or parallel to the absorption axis of the first linear polarizer 41, thereby ensuring an extremely low reflectivity of the liquid crystal display panel.

In an example, in a process of ambient light irradiating the liquid crystal display panel, the light passes through the first linear polarizer 41 to become linearly polarized light, and the linearly polarized light then passes through the third retardation film 53. Since the slow axis of the third retardation film 53 is perpendicular to or parallel to the absorption axis of the first linear polarizer 41, the linearly polarized light that passed through the first linear polarizer 41 has an unchanged polarization state after passing through the third retardation film 53. That is, it is still linearly polarized light with the same polarization direction as the incident linearly polarized light. Then, the linearly polarized light passes through the first quarter-wave plate 11 to become circularly polarized light. Then, the circularly polarized light is reflected, and then passes through the first quarter-wave plate 11 and the third retardation film 53 in sequence to become linearly polarized light. The polarization direction of the linearly polarized light is parallel to the absorption axis of the first linear polarizer 41. Thus, the linearly polarized light may be absorbed and cannot be emitted out, thereby ensuring a very low reflectivity of the liquid crystal display panel.

Based on the liquid crystal display panel having the structure shown in FIG. 10, in an embodiment of the present disclosure, an in-plane retardation Re1 of the first retardation film 51 may satisfies 8.64 nm≤Re1≤10.56 nm, and an out-of-plane retardation Rth1 of the first retardation film 51 satisfies 37.89 nm≤Rth1≤46.31 nm. An in-plane retardation Re2 of the second retardation film 52 satisfies 8.64 nm≤Re2≤10.56 nm, and an out-of-plane retardation Rth2 of the second retardation film 52 satisfies 37.89 nm≤Rth2≤46.31 nm. An in-plane retardation Re3 of the third retardation film 53 satisfies Re3=0, and an out-of-plane retardation Rth3 of the third retardation film 53 satisfies 316.8 nm≤Rth3≤387.2 nm. The in-plane retardation Re of the retardation film represents a phase difference of the retardation film in a plane of the retardation film. The out-of-plane retardation Rth of the retardation film represents a phase difference of the retardation film in a direction of the normal line of the retardation film. The calculation formulas of the in-plane retardation Re and the out-of-plane retardation Rth are as follows:

$$Re = (n_x - n_y) \times d;$$

$$Rth = [n_z - (n_x + n_y)/2] \times d;$$

where d represents a thickness of the retardation film, $n_x$ represents a refractive index in an x direction in a plane of the retardation film, $n_y$ represents a refractive index in a y direction in the plane of the retardation film, and $n_z$ represents a refractive index in a z direction in a plane perpendicular to the plane of the retardation film.

In an embodiment of the present disclosure, the retardation of each of the above-mentioned retardation films is within the above-mentioned range, to alleviate the problem of light leakage in a black state at large visual angles. Thus, the display panel has a large visual angle range, and a high contrast of the liquid crystal display panel can be ensured at the front visual angle.

Figures 13, 14:
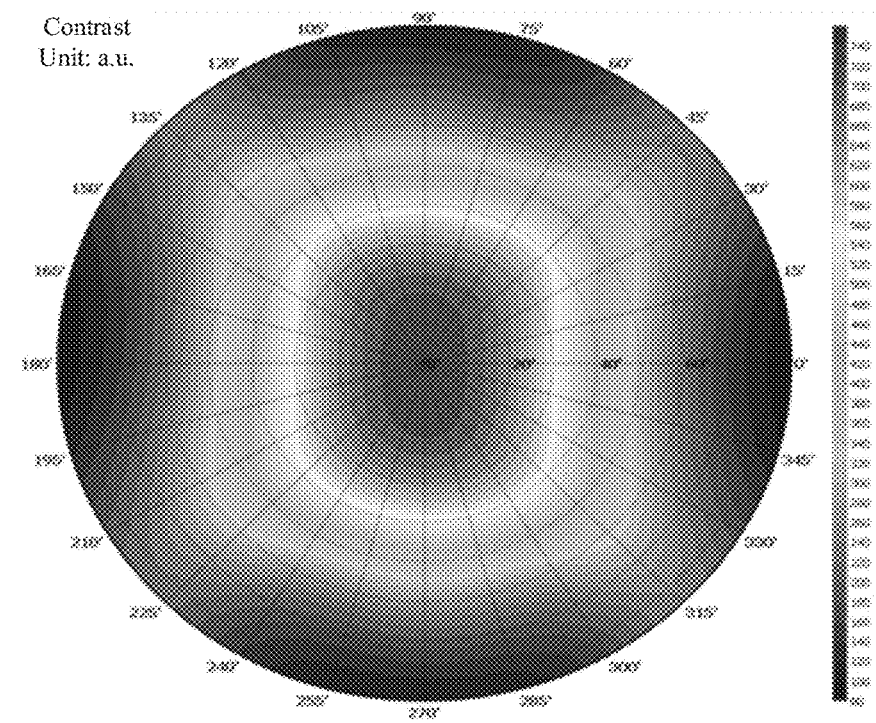
FIG. 13 is a simulation effect diagram of contrasts of the liquid crystal display panel shown in FIG. 10 at different visual angles according to an embodiment of the present disclosure.
FIG. 14 is a schematic cross-sectional view of still another liquid crystal display panel according to an embodiment of the present disclosure.

In an embodiment of the present disclosure, a liquid crystal display panel is simulated, which has the structure shown in FIG. 10 and satisfies retardation characteristics Re1=9.6 nm, Rth1=42.1 nm, Re2=9.6 nm, Rth2=42.1 nm, Re3=0 and Rth3=352 nm. FIG. 13 illustrates a contrast simulation diagram. In the following, Table 1, Table 2, Table 3, and Table 4 are schematic tables listing the Poincare sphere coordinates at four different visual angles. Herein, the Poincare sphere coordinates in Table 1 are obtained at a visual angle (45°, 45°), the Poincare sphere coordinates in Table 2 are obtained at a visual angle (45°, 135°), the Poincare sphere coordinates in Table 3 are obtained at a visual angle (45°, 225°), and the Poincare sphere coordinates in Table 4 are obtained at a visual angle (45°, 315°). It can be seen that, at each of these four visual angles, the light emitted from the third retardation film 53 is approximately linearly polarized light, and the polarization state of the light emitted from the third retardation film 53 is very similar to the polarization state of the light emitted from the second retardation film 42. This means that most of the linearly polarized light can be subsequently absorbed by the first linear polarizer 41, which proves that the liquid crystal display panel shown in FIG. 10 can significantly alleviate the problem of light leakage in a black state at a large visual angle.

TABLE 1

| Film layer | S1 coordinate | S2 coordinate | S3 coordinate |
| --- | --- | --- | --- |
| Third retardation film | −0.1403 | −0.9901 | 0.0081 |
| First quarter-wave plate | 0.09 | −0.9507 | 0.2967 |
| Second retardation film | 0.0478 | −0.9896 | −0.1356 |
| First retardation film | 0.1146 | −0.0464 | −0.9923 |
| Second quarter-wave plate | 0.1554 | 0.1803 | −0.9713 |
| Second linear polarizer | 0.1268 | −0.9919 | 0 |

TABLE 2

| Film layer | S1 coordinate | S2 coordinate | S3 coordinate |
| --- | --- | --- | --- |
| Third retardation film | −0.1475 | 0.9886 | −0.0286 |
| First quarter-wave plate | 0.1075 | 0.9449 | −0.3092 |
| Second retardation film | 0.1762 | 0.9761 | 0.1273 |
| First retardation film | 0.1204 | −0.0455 | −0.9917 |
| Second quarter-wave plate | 0.0542 | 0.1895 | −0.9804 |
| Second linear polarizer | 0.1272 | 0.9919 | 0 |

TABLE 3

| Film layer | S1 coordinate | S2 coordinate | S3 coordinate |
| --- | --- | --- | --- |
| Third retardation film | −0.1519 | −0.9884 | −0.0064 |
| First quarter-wave plate | 0.0694 | −0.9527 | 0.2958 |
| Second retardation film | 0.0288 | −0.9925 | −0.1189 |
| First retardation film | 0.0959 | −0.0475 | −0.9943 |
| Second quarter-wave plate | 0.1441 | 0.1859 | −0.9719 |
| Second linear polarizer | 0.1268 | −0.9919 | 0 |

TABLE 4

| Film layer | S1 coordinate | S2 coordinate | S3 coordinate |
| --- | --- | --- | --- |
| Third retardation film | −0.1455 | 0.9893 | 0.0065 |
| First quarter-wave plate | 0.0716 | 0.9543 | −0.2901 |
| Second retardation film | 0.1361 | 0.9829 | 0.1239 |
| First retardation film | 0.0903 | −0.0485 | −0.9947 |
| Second quarter-wave plate | 0.0311 | 0.1805 | −0.9831 |
| Second linear polarizer | 0.1272 | 0.9919 | 0 |

In addition, it can be seen by comparing FIG. 2 and FIG. 13 that the visual angle range with a high contrast (light-color area) in FIG. 13 is significantly larger than that in FIG. 2, and the visual angle range in FIG. 13 is expanded to about 2 times of the visual angle range of the liquid crystal display panel shown in FIG. 1. Moreover, it can be seen by comparing FIG. 2 and FIG. 13 that for a same large visual angle, for example, a visual angle (45°, 135°), the contrast in FIG. 13 is higher than the contrast in FIG. 2. This means that the liquid crystal display panel based on the design shown in FIG. 10 can have an increased contrast at a large visual angle.

FIG. 14 is a schematic cross-sectional view of still another liquid crystal display panel according to an embodiment of the present disclosure. In an embodiment, as shown in FIG. 14, the liquid crystal display panel further includes a fourth retardation film 54, which is disposed between the third retardation film 53 and the first linear polarizer 41. A slow axis of the fourth retardation film 54 is perpendicular to or parallel to the absorption axis of the first linear polarizer 41. The contrast at a large visual angle can be further increased by providing the fourth retardation film 54. Moreover, in this embodiment of the present disclosure, the slow axis of the fourth retardation film 54 is parallel to or perpendicular to the absorption axis of the first linear polarizer 41, thereby enabling an extremely low reflectivity of the liquid crystal display panel.

Based on the liquid crystal display panel having the structure shown in FIG. 14, in an embodiment of the present disclosure, an in-plane retardation Re1 of the first retardation film 51 satisfies 8.28 nm≤Re1≤10.12 nm, and an out-of-plane retardation Rth1 of the first retardation film 51 satisfies 36.36 nm≤Rth1≤44.44 nm; an in-plane retardation Re2 of the second retardation film 52 satisfies 8.28 nm≤Re2≤10.12 nm, and an out-of-plane retardation Rth2 of the second retardation film 52 satisfies 36.36 nm≤Rth2≤44.44 nm; an in-plane retardation Re3 of the third retardation film 53 satisfies 82.35 nm≤Re3≤100.65 nm, and an out-of-plane retardation Rth3 of the third retardation film 53 satisfies −50.38 nm≤Rth3≤−41.22 nm; and an in-plane retardation Re4 of the fourth retardation film satisfies Re4=0, and an out-of-plane retardation Rth4 of the fourth retardation film satisfies 95.4 nm≤Rth4≤116.6 nm, so as to alleviate the problem of light leakage in a black state at various large visual angles and increase the visual angle range of the display panel, as well as enable a high contrast of the liquid crystal display panel at a front visual angle.

Figure 15:
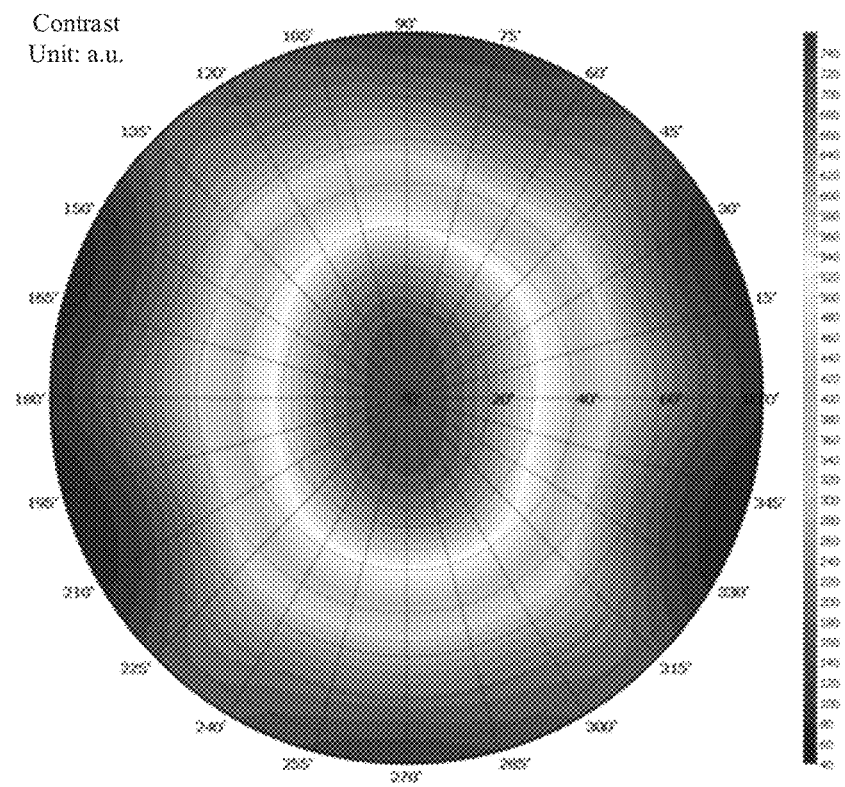
FIG. 15 is a simulation effect diagram of contrasts of the liquid crystal display panel shown in FIG. 14 at different visual angles according to an embodiment of the present disclosure.

In an embodiment of the present disclosure, the contrast of the liquid crystal display panel is simulated, where the liquid crystal display panel has the structure shown in FIG. 14 and satisfies retardation characteristics Re1=9.2 nm, Rth1=40.4 nm; Re2=9.2 nm, Rth2=40.4 nm; Re3=91.5 nm, Rth3=−45.8 nm; Re3=0, Rth3=106 nm. FIG. 15 illustrates a contrast simulation diagram. In the following, Table 5, Table 6, Table 7, and Table 8 are schematic tables listing the Poincare sphere coordinates at four different visual angles. Herein, the Poincare sphere coordinates in Table 5 are obtained at a visual angle (45°, 45°), the Poincare sphere coordinates in Table 6 are obtained at a visual angle (45°, 135°), the Poincare sphere coordinates in Table 7 are obtained at a visual angle (45°, 225°), and the Poincare sphere coordinates in Table 8 are obtained at a visual angle (45°, 315°). It can be seen that, at each of these four visual angles, the light emitted from the fourth retardation film is approximately linearly polarized light, and at each visual angle, the polarization state of the light emitted from the fourth retardation film is very similar to the polarization state of the light emitted from the second linear polarizer 42. This means that most of the linearly polarized light can be subsequently absorbed by the first linear polarizer 41, which proves that the liquid crystal display panel shown in FIG. 14 can significantly alleviate the problem of light leakage in a black state at a large visual angle.

TABLE 5

| Film layer | S1 coordinate | S2 coordinate | S3 coordinate |
| --- | --- | --- | --- |
| Fourth retardation film | −0.1362 | −0.9907 | −0.0085 |
| Third retardation film | −0.128 | −0.9534 | −0.2732 |
| First quarter-wave plate | 0.037 | −0.9895 | −0.1398 |
| Second retardation film | 0.1141 | −0.0438 | −0.9925 |
| First retardation film | 0.0075 | 0.0725 | −0.9973 |
| Second quarter-wave plate | 0.1469 | 0.1826 | −0.9721 |
| Second linear polarizer | 0.1268 | −0.9919 | 0 |

TABLE 6

| Film layer | S1 coordinate | S2 coordinate | S3 coordinate |
| --- | --- | --- | --- |
| Fourth retardation film | −0.619 | 0.7853 | −0.009 |
| Third retardation film | −0.1318 | 0.9912 | 0.0076 |
| First quarter-wave plate | −0.1227 | 0.9519 | 0.2809 |
| Second retardation film | 0.1594 | 0.9768 | 0.1428 |
| First retardation film | 0.1146 | −0.0284 | −0.993 |
| Second quarter-wave plate | 0.2198 | 0.0805 | −0.9722 |
| Second linear polarizer | 0.1272 | 0.9919 | 0 |

TABLE 7

| Film layer | S1 coordinate | S2 coordinate | S3 coordinate |
| --- | --- | --- | --- |
| Fourth retardation film | −0.1247 | −0.9922 | 0.0065 |
| Third retardation film | −0.1156 | −0.9566 | −0.2674 |
| First quarter-wave plate | 0.0431 | −0.9905 | −0.1307 |
| Second retardation film | 0.12 | −0.0371 | −0.9921 |
| First retardation film | 0.0167 | 0.0765 | −0.9969 |
| Second quarter-wave plate | 0.1529 | 0.1836 | −0.971 |
| Second linear polarizer | 0.1268 | −0.9919 | 0 |

TABLE 8

| Film layer | S1 coordinate | S2 coordinate | S3 coordinate |
| --- | --- | --- | --- |
| Fourth retardation film | −0.1356 | −0.9908 | −0.0023 |
| Third retardation film | 0.0816 | −0.9537 | 0.2896 |
| First quarter-wave plate | −0.9895 | −0.1398 | 0.8384 |
| Second retardation film | 0.1141 | −0.0438 | −0.9925 |
| First retardation film | 0.0075 | 0.0725 | −0.9973 |
| Second quarter-wave plate | 0.1469 | 0.1826 | −0.9721 |
| Second linear polarizer | 0.1268 | −0.9919 | 0 |

In addition, it can be seen by comparing FIG. 2 and FIG. 15 that the visual angle range with a high contrast in FIG. 15 is significantly larger than that in FIG. 2, and the visual angle range in FIG. 15 is expanded to about 2 times of the visual angle range of the liquid crystal display panel shown in FIG. 1. Moreover, it can be seen by comparing FIG. 15 and FIG. 2 that for a same large visual angle, for example, a visual angle (45°, 135°), the contrast in FIG. 15 is higher than the contrast in FIG. 2. This means that the liquid crystal display panel based on the design shown in FIG. 14 can have an increased contrast at a large visual angle.

In an embodiment of the present disclosure, an in-plane retardation Re1 of the first retardation film 51 satisfies 8.28 nm≤Re1≤10.12 nm, and an out-of-plane retardation Rth1 of the first retardation film 51 satisfies 36.36 nm≤Rth1≤44.44 nm; an in-plane retardation Re2 of the second retardation film 52 satisfies 8.28 nm≤Re2≤10.12 nm, and an out-of-plane retardation Rth2 of the second retardation film 52 satisfies 36.36 nm≤Rth2≤44.44 nm; an in-plane retardation Re3 of third retardation film 53 satisfies 28.8 nm≤Re3≤35.2 nm, and an out-of-plane retardation Rth3 of third retardation film 53 satisfies 126.36 nm≤Rth3≤154.44 nm; and an in-plane retardation Re4 of the fourth retardation film satisfies 101.52 nm≤Re4≤124.08 nm, and an out-of-plane retardation Rth4 of the fourth retardation film satisfies −86.68 nm≤Rth4≤−70.92 nm, so as to alleviate the problem of light leakage in a black state at various large visual angles and increase the visual angle range of the display panel, as well as enable a high contrast of the liquid crystal display panel at a front visual angle.

Figure 16:
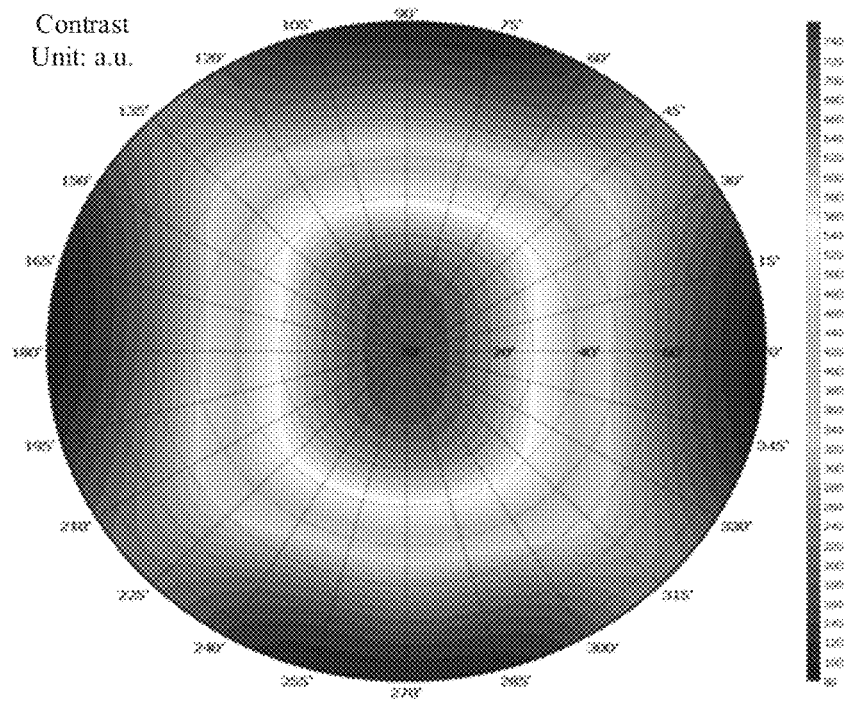
FIG. 16 is another contrast simulation effect diagram of contrasts of the liquid crystal display panel shown in FIG. 14 at different visual angles according to an embodiment of the present disclosure.

In an embodiment of the present disclosure, the contrast of the liquid crystal display panel is simulated, where the liquid crystal display panel has the structure shown in FIG. 14 and satisfies retardation characteristics Re1=9.2 nm, Rth1=40.4 nm; Re2=9.2 nm, Rth2=40.4 nm; Re3=32 nm, Rth3=140.4 nm; Re4=112.8 nm, and Rth4=−78.8 nm. FIG. 16 illustrates a contrast simulation diagram. In the following, Table 9, Table 10, Table 11, and Table 12 are schematic tables listing the Poincare sphere coordinates at four different visual angles. Herein, the Poincare sphere coordinates in Table 9 are obtained at a visual angle (45°, 45°), the Poincare sphere coordinates in Table 10 are obtained at a visual angle (45°, 135°), the Poincare sphere coordinates in Table 11 are obtained at a visual angle (45°, 225°), and the Poincare sphere coordinates in Table 12 are obtained at a visual angle (45°, 315°). It can be seen that, at each of these four visual angles, the light emitted from the fourth retardation film 54 is approximately linearly polarized light, and at each visual angle, the polarization state of the light emitted from the fourth retardation film is very similar to the polarization state of the light emitted from the second linear polarizer 42. This means that most of the linearly polarized light can be subsequently absorbed by the first linear polarizer 41, which proves that the liquid crystal display panel shown in FIG. 14 can significantly alleviate the problem of light leakage in a black state at a large visual angle.

TABLE 9

| Film layer | S1 coordinate | S2 coordinate | S3 coordinate |
| --- | --- | --- | --- |
| Fourth retardation film | −0.1356 | −0.9908 | −0.0023 |
| Third retardation film | 0.0816 | −0.9537 | 0.2896 |
| First quarter-wave plate | −0.9895 | −0.1398 | 0.8384 |
| Second retardation film | 0.1141 | −0.0438 | −0.9925 |
| First retardation film | 0.0075 | 0.0725 | −0.9973 |
| Second quarter-wave plate | 0.1469 | 0.1826 | −0.9721 |
| Second linear polarizer | 0.1268 | −0.9919 | 0 |

TABLE 10

| Film layer | S1 coordinate | S2 coordinate | S3 coordinate |
| --- | --- | --- | --- |
| Fourth retardation film | −0.1313 | 0.9913 | −0.0124 |
| Third retardation film | 0.0971 | 0.9521 | −0.2899 |
| First quarter-wave plate | 0.9768 | 0.1428 | 0.8384 |
| Second retardation film | 0.1146 | −0.0284 | −0.993 |
| First retardation film | 0.2198 | 0.0805 | −0.9722 |
| Second quarter-wave plate | 0.0452 | 0.1914 | −0.9805 |
| Second linear polarizer | 0.1272 | 0.9919 | 0 |

TABLE 11

| Film layer | S1 coordinate | S2 coordinate | S3 coordinate |
| --- | --- | --- | --- |
| Fourth retardation film | −0.1411 | −0.99 | 0.0084 |
| Third retardation film | 0.0868 | −0.9532 | 0.2895 |
| First quarter-wave plate | 0.0431 | −0.9905 | −0.1307 |
| Second retardation film | 0.12 | −0.0371 | −0.9921 |
| First retardation film | 0.0167 | 0.0765 | −0.9969 |
| Second quarter-wave plate | 0.1529 | 0.1836 | −0.971 |
| Second linear polarizer | 0.1268 | −0.9919 | 0 |

TABLE 12

| Film layer | S1 coordinate | S2 coordinate | S3 coordinate |
| --- | --- | --- | --- |
| Fourth retardation film | −0.1415 | 0.9899 | −0.008 |
| Third retardation film | 0.0866 | 0.9531 | −0.2902 |
| First quarter-wave plate | 0.1501 | 0.9803 | 0.1285 |
| Second retardation film | 0.1156 | −0.0419 | −0.9924 |
| First retardation film | 0.2177 | 0.0643 | −0.9739 |

TABLE 12-continued

| Film layer | S1 coordinate | S2 coordinate | S3 coordinate |
| --- | --- | --- | --- |
| Second quarter-wave plate | 0.0398 | 0.1781 | −0.9832 |
| Second linear polarizer | 0.1272 | 0.9919 | 0 |

It can be seen by comparing FIG. 2 and FIG. 16 that the visual angle range with a high contrast in FIG. 16 is significantly larger than that in FIG. 2. The visual angle range in FIG. 16 is expanded to about 2 times of the visual angle range of the liquid crystal display panel shown in FIG. 1. Moreover, it can be seen by comparing FIG. 2 and FIG. 16 that for a same large visual angle, for example, a visual angle (45°, 135°), the contrast in FIG. 16 is higher than the contrast in FIG. 2. This means that the liquid crystal display panel based on the design shown in FIG. 14 can have an increased contrast at a large visual angle. In FIG. 16, the contrast at a front visual angle, that is, a center contrast is about 738.5.

Figure 17:
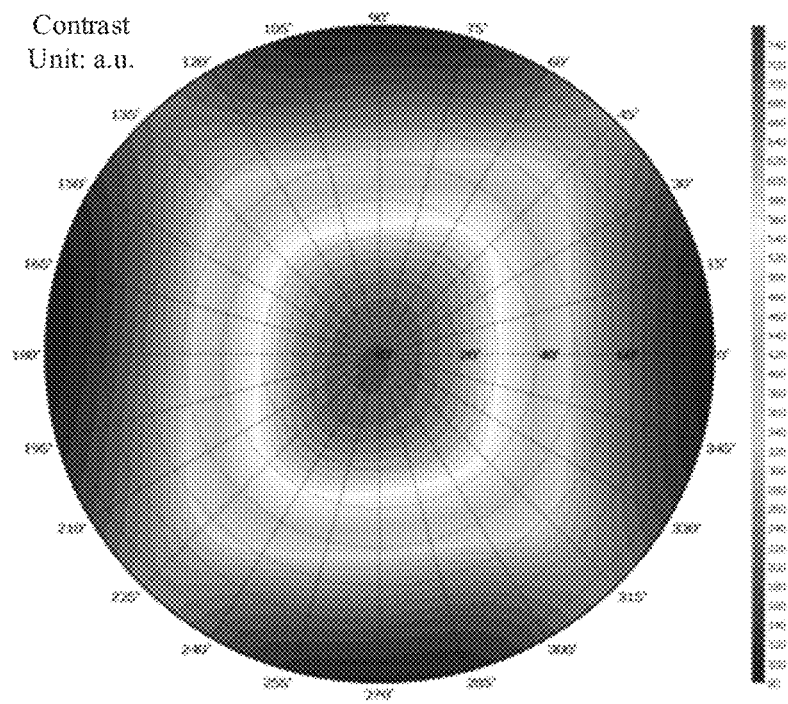
FIG. 17 is still another simulation effect diagram of contrasts of the liquid crystal display panel shown in FIG. 14 at different visual angles according to an embodiment of the present disclosure.

In an embodiment of the present disclosure, a contrast of the liquid crystal display panel is simulated, where the liquid crystal display has the structure shown in FIG. 14 and satisfies retardation characteristics Re1=9.2 nm, Rth1=40.4 nm; Re2=9.2 nm, Rth2=40.4 nm; Re3=28.8 nm, Rth3=126.36 nm; Re4=112.8 nm, and Rth4=−78.8 nm. FIG. 17 illustrates a contrast simulation diagram, in which the center contrast is about 721.6. The visual angle range in the simulation result shown in FIG. 17 is significantly larger than that in the simulation result shown in FIG. 2.

Figure 18:
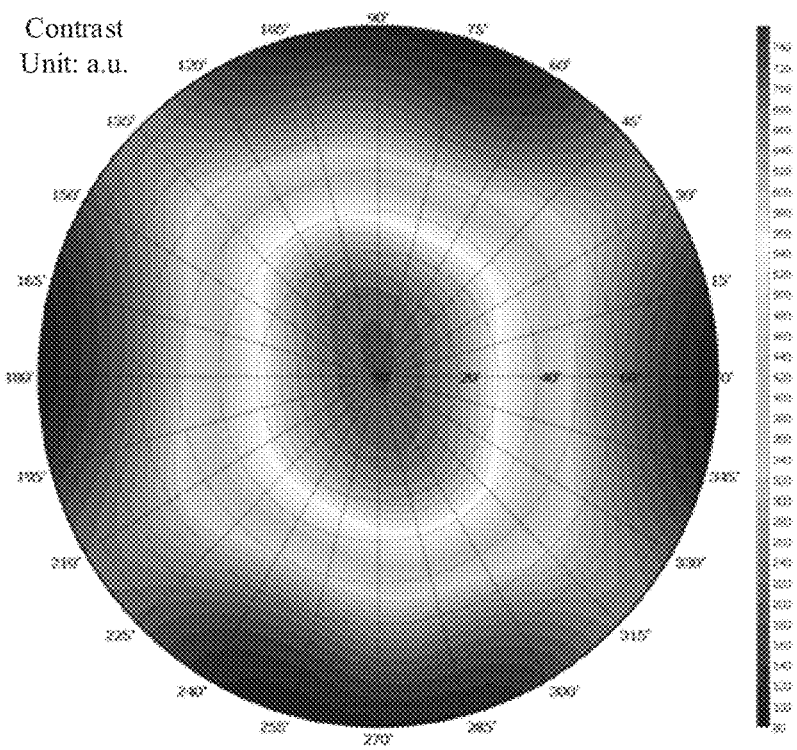
FIG. 18 is still another simulation effect diagram of contrasts of the liquid crystal display panel shown in FIG. 14 at different visual angles according to an embodiment of the present disclosure.

In an embodiment of the present disclosure, a contrast of the liquid crystal display panel is simulated, where the liquid crystal display has the structure shown in FIG. 14 and satisfies retardation characteristics Re1=9.2 nm, Rth1=40.4 nm; Re2=9.2 nm, Rth2=40.4 nm; Re3=35.2 nm, Rth3=154.44 nm; Re4=112.8 nm, Rth4=−78.8 nm. FIG. 18 illustrates a contrast simulation diagram, in which the center contrast is about 721.7. The visual angle range in the simulation result shown in FIG. 18 is significantly larger than that in the simulation result shown in FIG. 2.

Figures 19, 20:
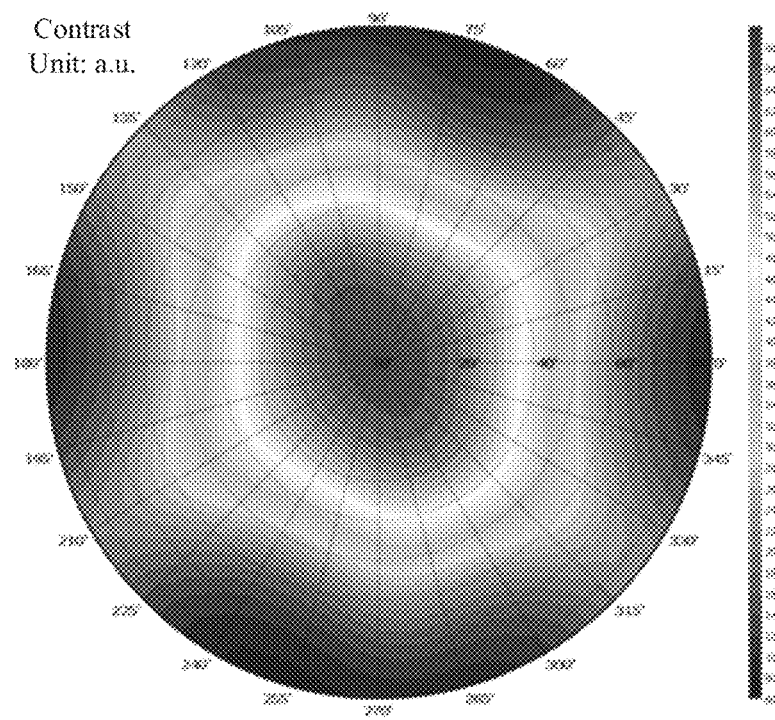
FIG. 19 is still another simulation effect diagram of contrasts of the liquid crystal display panel shown in FIG. 14 at different visual angles according to an embodiment of the present disclosure.
FIG. 20 is a schematic cross-sectional view of still another liquid crystal display panel according to an embodiment of the present disclosure.

In an embodiment, the retardation of at least one of the retardation films is beyond the range specified by the present disclosure, for example, Re3=36.8 nm and Rth3=161.46 nm. The first retardation film, the second retardation film, and the fourth retardation film are still within the above-mentioned range, for example, Re1=9.2 nm, Rth1=40.4 nm; Re2=9.2 nm, Rth2=40.4 nm; and Re4=112.8 nm, Rth4=−78.8 nm. In an embodiment of the present disclosure, a contrast of the liquid crystal display panel is simulated, where the liquid crystal display panel satisfies the above-mentioned retardation characteristics and has the structure shown in FIG. 14. FIG. 19 illustrates a contrast simulation diagram. The center contrast in FIG. 19 is about 676.2, which is only about 91% of the center contrast of the structure shown in FIG. 16. Thus, the display effect of the liquid crystal display panel is degraded. It also shows that by setting the retardation of each retardation film within the above-mentioned range specified in the embodiments of the present disclosure, the problem of light leakage in a black state at various large visual angles can be alleviated, the display panel can have a large visual angle range, and the liquid crystal display panel can have a high contrast at a front visual angle.

Alternatively, in an embodiment of the present disclosure, an orientation of the liquid crystal layer 30 may be set to a horizontal domain structure parallel to a direction of the absorption axis of the first linear polarizer 41. In this case, as shown in FIG. 20, which is a schematic cross-sectional view of another liquid crystal display panel according to an embodiment of the present disclosure. In the embodiment of the present disclosure, a third retardation film 53 may be provided between the liquid crystal layer 30 and the second linear polarizer 42, and the slow axis of the third retardation film 53 is perpendicular to the absorption axis of the second linear polarizer 42. The polarization state of the light emitted from the second linear polarizer 42 is adjusted to be parallel to the orientation of the liquid crystals by providing the third retardation film 53.

If the third retardation film 53 is not provided, the retardation of the liquid crystals will change when a cell thickness fluctuates due to factors such as production line process. In order to ensure a contrast at large visual angles, it needs to adjust the parameters of the first retardation film 51 and/or the second retardation film 52 according to the cell thickness of each liquid crystal display panel. The adjusting process is complicated and is not suitable for mass production. In this embodiment of the present disclosure, in the black state, that is, when electricity is not applied to the liquid crystal layer 30, the polarization state of the light emitting from the third retardation film 53 and then passing through the liquid crystal layer 30 is not changed by providing the third retardation film 53. In this way, the final light-output effect at a large visual angle may not be affected by the liquid crystals, eliminating an influence of the liquid crystals on light leakage in the black state. Thus, the parametric design for the structure including the first retardation film 51 and the second retardation film 52 can be applied to the liquid crystal display panels having different cell thicknesses. When the thickness of the liquid crystal cell fluctuates due to factors such as a production line process, the above-mentioned design can still be applied, thereby extending an application scope of the embodiments of the present disclosure.

In addition, in the horizontal domain structure, the orientation of the liquid crystals is consistent with an angle of the absorption axis of the first linear polarizer 41. Therefore, at a large visual angle, polarization of the liquid crystal layer 30 and polarization of the first linear polarizer 41 will have a same degree of deviation. No retardation film needs to be further designed in addition to the first quarter-wave plate, thereby advantageously reducing the thickness of the display panel.

In an embodiment, for the liquid crystal display panel having the structure shown in FIG. 20, an in-plane retardation Re1 of the first retardation film 51 satisfies 8.64 nm≤Re1≤10.56 nm, and an out-of-plane retardation Rth1 of the first retardation film 51 satisfies 37.89 nm≤Rth1≤46.31 nm; an in-plane retardation Re2 of the second retardation film 52 satisfies 6.84 nm≤Re1≤8.8 nm, and an out-of-plane retardation Rth2 of the second retardation film 52 satisfies 29.97 nm≤Rth1≤38.61 nm; an in-plane retardation Re3 of the third retardation film 53 satisfies 132.12 nm≤Rth3≤167.86 nm, and an out-of-plane retardation Rth3 of the third retardation film 53 satisfies Rth3=0, so as to alleviate the problem of light leakage in a black state at various large visual angles and increase the visual angle range of the display panel, as well as enable a high contrast of the liquid crystal display panel at a front visual angle.

Figure 21:
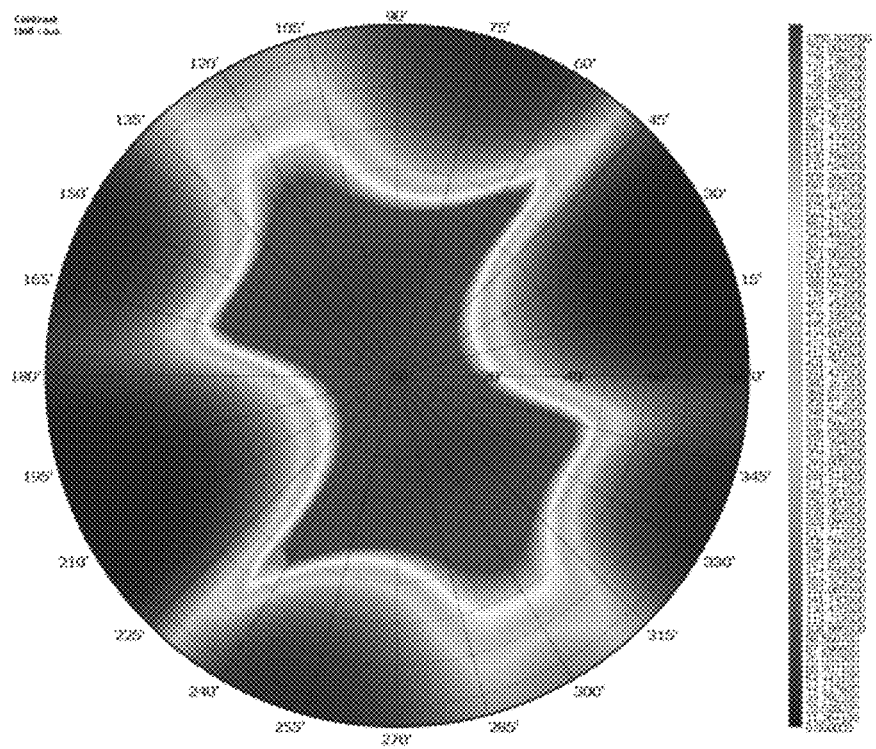
FIG. 21 is a simulation effect diagram of contrasts of the liquid crystal display panel shown in FIG. 20 at different visual angles according to an embodiment of the present disclosure.

In an embodiment of the present disclosure, a contrast of the liquid crystal display panel is simulated, where the liquid crystal display panel has the structure shown in FIG. 20 and satisfies retardation characteristics Re1=9.6 nm, Rth1=42.1 nm; Re2=8 nm, Rth2=35.1 nm; Re3=146.8 nm, and Rth3=0. FIG. 21 illustrates a contrast simulation diagram. It can be seen by comparing FIG. 2 and FIG. 21 that the visual angle range with a high contrast in FIG. 21 is significantly larger than that in FIG. 2. Moreover, it can be seen by comparing FIG. 2 and FIG. 21 that for a same large visual angle, for example, a visual angle (45°, 45°), the contrast in FIG. 21 is higher than the contrast in FIG. 2. This means that the liquid crystal display panel based on the design shown in FIG. 20 can have an increased contrast at the large visual angle.

Figure 22:
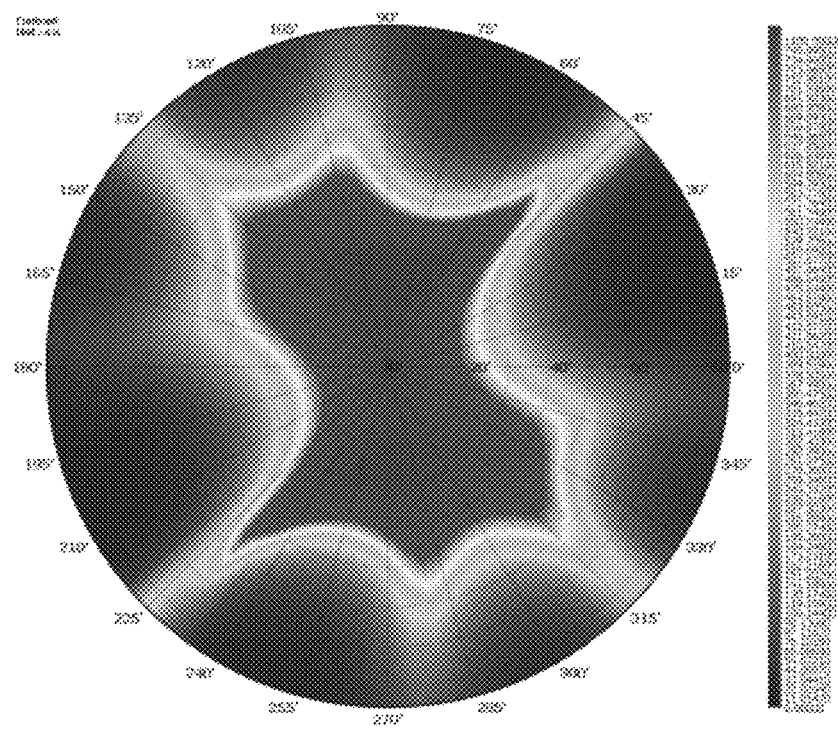
FIG. 22 is another simulation effect diagram of contrasts of the liquid crystal display panel shown in FIG. 20 at different visual angles according to an embodiment of the present disclosure.

In an embodiment of the present disclosure, a contrast of the liquid crystal display panel is simulated, where the liquid crystal display has the structure shown in FIG. 20 and satisfies retardation characteristics Re1=9.6 nm, Rth1=42.1 nm; Re2=7.6 nm, Rth2=33.3 nm; Re3=152.6 nm, Rth3=0. FIG. 22 illustrates a contrast simulation diagram. The visual angle range with a high contrast in FIG. 22 is significantly larger than that in FIG. 2. Moreover, it can be seen by comparing FIG. 2 and FIG. 22 that for a same large visual angle, for example, a visual angle (45°, 45°), the contrast in FIG. 22 is higher than the contrast in FIG. 2. This means that the liquid crystal display panel based on the design shown in FIG. 20 can have an increased contrast at the large visual angle.

Figures 23, 24:
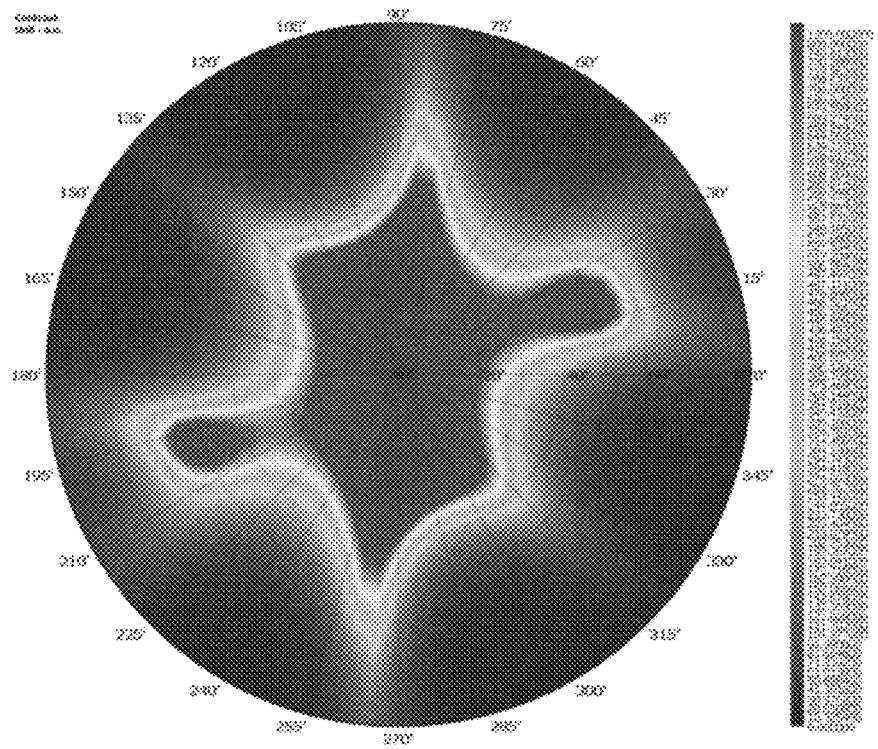
FIG. 23 is a schematic cross-sectional view of still another liquid crystal display panel according to an embodiment of the present disclosure.
FIG. 24 is a simulation effect diagram of contrasts of the liquid crystal display panel shown in FIG. 23 at different visual angles according to an embodiment of the present disclosure.

FIG. 23 is a schematic cross-sectional view of still another liquid crystal display panel according to an embodiment of the present disclosure. In an embodiment, the liquid crystal display panel further includes a fourth retardation film 54, which is disposed between the third retardation film 53 and the liquid crystal layer 30. A slow axis of the fourth retardation film 54 is parallel to the slow axis of the third retardation film 53. When the polarization state of the light emitted from the third retardation film 53 deviates from an ideal state, the arrangement of the fourth retardation film 54 can make the polarization state of the light directed to the liquid crystal layer 30 be closer to an acceptable direction of the liquid crystal. Thus, the final light-output effect at a large visual angle may not be affected by the liquid crystals, and the influence of the liquid crystals on light leakage in the black state may be eliminated.

In an embodiment, based on the liquid crystal display panel having the structure shown in FIG. 23, an in-plane retardation Re1 of the first retardation film 51 satisfies 3.6 nm≤Re1≤4.4 nm, and an out-of-plane retardation Rth1 of the first retardation film 51 satisfies 15.84 nm≤Rth1≤19.36 nm; an in-plane retardation Re2 of the second retardation film 52 satisfies 6.66 nm≤Re2≤8.14 nm, and an out-of-plane retardation Rth2 of the second retardation film 52 satisfies 29.25 nm≤Rth2≤35.75 nm; an in-plane retardation Re3 of the third retardation film 53 satisfies 3.6 nm≤Re3≤4.4 nm, and an out-of-plane retardation Rth3 of the third retardation film 53 satisfies 15.84 nm≤Rth3≤19.36 nm; and an in-plane retardation Re4 of the fourth retardation film satisfies 84.15 nm≤Re4≤102.85 nm, and an out-of-plane retardation Rth4 of the fourth retardation film satisfies −71.83 nm≤Rth4≤−58.77 nm, so as to alleviate the problem of light leakage in a black state at various large visual angles and increase the visual angle range of the display panel, as well as ensuring a high contrast of the liquid crystal display panel at a front visual angle.

In an embodiment of the present disclosure, a contrast of the liquid crystal display panel is simulated, where the liquid crystal display has the structure shown in FIG. 23 and satisfies retardation characteristics Re1=4.0 nm, Rth1=17.6 nm; Re2=7.4 nm, Rth2=32.5 nm; Re3=4.0 nm, Rth3=17.6 nm; Re4=93.5 nm, and Rth4=−65.3 nm. FIG. 24 illustrates a contrast simulation diagram. It can be seen by comparing FIG. 2 and FIG. 24 that the visual angle range with a high contrast (light-color area) in FIG. 24 is significantly larger than that in FIG. 2. Moreover, it can be seen by comparing FIG. 2 and FIG. 24 that for a same large visual angle, for example, a visual angle (45°, 80°), the contrast in FIG. 24 is higher than the contrast in FIG. 2. This means that the liquid crystal display panel based on the design shown in FIG. 23 can have an increased contrast at a large visual angle.

Alternatively, in an embodiment, an in-plane retardation Re1 of the first retardation film 51 satisfies 21.6 nm≤Re1≤26.4 nm, and an out-of-plane retardation Rth1 of the first retardation film 51 satisfies 94.77 nm≤Rth1≤115.83 nm; an in-plane retardation Re2 of the second retardation film 52 satisfies 25.2 nm≤Re2≤30.8 nm, and an out-of-plane retardation Rth2 of the second retardation film 52 satisfies 110.61 nm≤Rth2≤135.19 nm; an in-plane retardation Re3 of third retardation film 53 satisfies Re3=0, and an out-of-plane retardation Rth3 of third retardation film 53 satisfies 1647.09 nm≤Rth3≤2013.11 nm; an in-plane retardation Re4 of the fourth retardation film satisfies 9.36 nm≤Re4≤11.44 nm, and an out-of-plane retardation Rth4 of the fourth retardation film satisfies −5.72 nm≤Rth4≤−4.68 nm, so as to alleviate the problem of light leakage in a black state at various large visual angles and increase the visual angle range of the display panel, as well as ensuring a high contrast of the liquid crystal display panel at a front visual angle.

Figure 25:
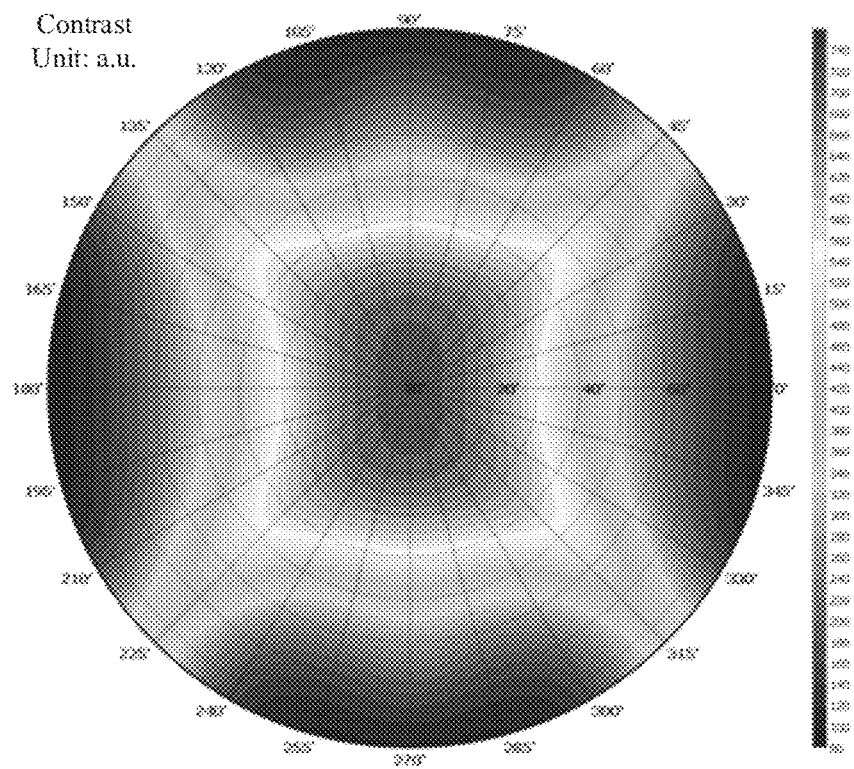
FIG. 25 is a simulation effect diagram of contrasts of the liquid crystal display panel shown in FIG. 23 at different visual angles according to an embodiment of the present disclosure.

In an embodiment of the present disclosure, a contrast of the liquid crystal display panel is simulated, where the liquid crystal display has the structure shown in FIG. 23 and satisfies retardation characteristics Re1=24 nm, Rth1=105.3 nm; Re2=28 nm, Rth2=122.9 nm; Re3=0, Rth3=1830.1 nm; Re4=10.4 nm, Rth4=−5.2 nm. FIG. 25 illustrates a contrast simulation diagram. It can be seen by comparing FIG. 2 and FIG. 25 that the visual angle range with a high contrast in FIG. 25 is significantly larger than that in FIG. 2. Moreover, it can be seen by comparing FIG. 2 and FIG. 25 that for a same large visual angle, for example, a visual angle (45°, 45°), the contrast in FIG. 25 is higher than the contrast in FIG. 2. This means that the liquid crystal display panel based on the design shown in FIG. 23 can have an increased contrast at a large visual angle.

Alternatively, in an embodiment, an in-plane retardation Re1 of the first retardation film 51 satisfies 3.6 nm≤Re1≤4.4 nm, and an out-of-plane retardation Rth1 of the first retardation film 51 satisfies 15.84 nm≤Rth1≤19.36 nm; an in-plane retardation Re2 of the second retardation film 52 satisfies 6.84 nm≤Re2≤8.36 nm, and an out-of-plane retardation Rth2 of the second retardation film 52 satisfies 29.97 nm≤Rth2≤36.63 nm; an in-plane retardation Re3 of the third retardation film 53 satisfies 10.8 nm≤Re3≤13.2 nm, and an out-of-plane retardation Rth3 of the third retardation film 53 satisfies 47.43 nm≤Rth3≤57.97 nm; and an in-plane retardation Re4 of the fourth retardation film 54 satisfies 150.84 nm≤Re4≤184.36 nm, and an out-of-plane retardation Rth4 of the fourth retardation film 54 satisfies −128.7 nm≤Rth4≤−105.3 nm, so as to alleviate the problem of light leakage in a black state at various large visual angles and increase the visual angle range of the display panel, as well as ensuring a high contrast of the liquid crystal display panel at a front visual angle.

Figure 26:
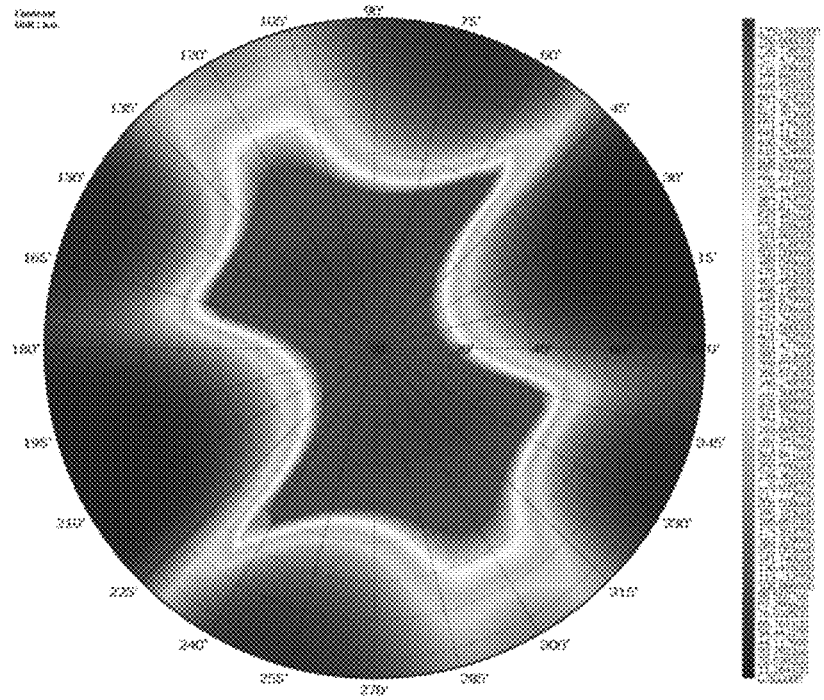
FIG. 26 is a simulation effect diagram of contrasts of the liquid crystal display panel shown in FIG. 23 at different visual angles according to an embodiment of the present disclosure.

In an embodiment of the present disclosure, a contrast of the liquid crystal display panel is simulated, where the liquid crystal display has the structure shown in FIG. 23 and satisfies retardation characteristics Re1=4 nm, Rth1=17.6 nm; Re2=7.6 nm, Rth2=33.3 nm; Re3=12.0 nm, Rth3=52.7 nm; Re4=167.6 nm, Rth4=−117.0 nm. FIG. 26 illustrates a contrast simulation diagram. It can be seen by comparing FIG. 2 and FIG. 26 that the visual angle range with a high contrast in FIG. 26 is significantly larger that in FIG. 2. Moreover, it can be seen by comparing FIG. 2 and FIG. 26 that for a same large visual angle, for example, a visual angle (45°, 45°), the contrast in FIG. 26 is higher than the contrast in FIG. 2. This means that the liquid crystal display panel based on the design shown in FIG. 23 can have an increased contrast at the large visual angle.

In an embodiment of the present disclosure, the types of the first linear polarizer 41 and the second linear polarizer 42 are not particularly limited. For example, the first linear polarizer 41 and the second linear polarizer 42 may be of a polymer iodine-polyvinyl alcohol type, or may be metal wire grids, or may be formed by dye liquid crystals.

In an embodiment, the first retardation film 51 and/or second retardation film 52 described above may be disposed between the first substrate 10 and the first linear polarizer 41. That is, the first retardation film 51 and/or the second retardation film 52 may be arranged outside the liquid crystal cell, thereby preventing a manufacturing process of the first retardation film 51 and/or the second retardation film 52 from affecting a manufacturing process of an original film layer in the liquid crystal cell.

In an embodiment, the first retardation film 51 and/or the second retardation film 52 may be formed by polymer liquid crystals. The manufacturing process of the polymer liquid crystals may be compatible with the process of the original film layer in the liquid crystal cell. Thus, the manufacturing process of the first retardation film 51 and/or the second retardation film 52 may be integrated with the manufacturing process of the original film layer in the liquid crystal cell, thereby improving process integration.

In an example, any one of the first quarter-wave plate 11 and the second quarter-wave plate 12 described above may also be formed by polymer liquid crystals.

For example, in an embodiment of the present disclosure, the first retardation film 51, the second retardation film 52, the third retardation film 53, and the fourth retardation film 54 described above may be a single-axis retardation film with one optical axis, or may be a dual-axes retardation film with two optical axes. Herein, the single-axial retardation film may be an A film or a C film, an optical axis of the A film is parallel to a plane of the retardation film, and an optical axis of the C film is perpendicular to the plane of the retardation film. The dual-axes retardation film is a B film.

Figure 27:
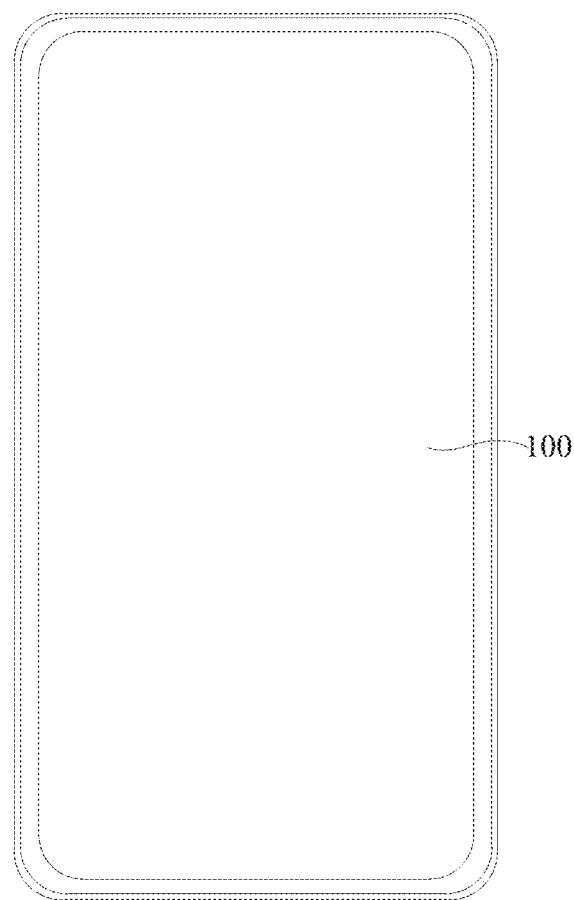
FIG. 27 is a schematic cross-sectional view of a display device according to an embodiment of the present disclosure.

A display device is provided according to an embodiment of the present disclosure, as shown in FIG. 27. FIG. 27 is a schematic cross-sectional view of a display device according to an embodiment of the present disclosure. The display device includes the liquid crystal display panel described above. A structure of the display panel 100 has been described in detail in the above-mentioned embodiments, and will not be repeated herein. It should be noted that the display device shown in FIG. 27 is merely for schematic illustration. The display device may be any electronic device with a display function, such as a mobile phone, a tablet computer, a notebook computer, an electronic paper book, a television, an on-board monitor, etc.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A liquid crystal display panel, comprising:
   a first substrate;
   a second substrate opposite to the first substrate;
   a liquid crystal layer disposed between the first substrate and the second substrate;
   a first linear polarizer disposed at a side of the first substrate facing away from the liquid crystal layer;
   a first quarter-wave plate disposed between the first substrate and the first linear polarizer, wherein an angle between a slow axis of the first quarter-wave plate and an absorption axis of the first linear polarizer is 45° or 135°;
   a first retardation film disposed between the liquid crystal layer and the first quarter-wave plate;
   a second quarter-wave plate disposed between the liquid crystal layer and the first substrate, wherein a slow axis of the second quarter-wave plate is perpendicular to the slow axis of the first quarter-wave plate;
   a second linear polarizer disposed at a side of the second substrate facing away from the liquid crystal layer, wherein an absorption axis of the second linear polarizer is perpendicular to the absorption axis of the first linear polarizer; and
   a second retardation film disposed between the first quarter-wave plate and the first retardation film, wherein a slow axis of the first retardation film is perpendicular to a slow axis of the second retardation film.

2. The liquid crystal display panel according to claim 1, wherein an orientation of the liquid crystal layer is parallel to the absorption axis of the second linear polarizer.

3. The liquid crystal display panel according to claim 2, wherein a retardation of the first retardation film is equal to a retardation of the second retardation film.

4. The liquid crystal display panel according to claim 3, further comprising a third retardation film disposed between the first quarter-wave plate and the first linear polarizer, wherein a slow axis of the third retardation film is perpendicular to or parallel to the absorption axis of the first linear polarizer.

5. The liquid crystal display panel according to claim 4, further comprising a fourth retardation film disposed between the third retardation film and the first linear polarizer, wherein a slow axis of the fourth retardation film is perpendicular to or parallel to the absorption axis of the first linear polarizer.

6. The liquid crystal display panel according to claim 5,
   wherein an in-plane retardation of the first retardation film is Re1, and an out-of-plane retardation of the first retardation film is Rth1, wherein 8.28 nm≤Re1≤10.12 nm, and 36.36 nm≤Rth1≤44.44 nm;
   wherein an in-plane retardation of the second retardation film is Re2, and an out-of-plane retardation of the second retardation film is Rth2, wherein 8.28 nm≤Re2≤10.12 nm, and 36.36 nm≤Rth2≤44.44 nm;
   wherein an in-plane retardation of the third retardation film is Re3, and an out-of-plane retardation of the third retardation film is Rth3, wherein −50.38 nm≤Rth3≤−41.22 nm, and 82.35 nm≤Re3≤100.65 nm; and
   wherein an in-plane retardation of the fourth retardation film is Re4, and an out-of-plane retardation of the fourth retardation film is Rth4, wherein Re4=0, and 95.4 nm≤Rth4≤116.6 nm.

7. The liquid crystal display panel according to claim 5,
   wherein an in-plane retardation of the first retardation film is Re1, and an out-of-plane retardation of the first retardation film is Rth1, wherein 8.28 nm≤Re1≤10.12 nm, and 36.36 nm≤Rth1≤44.44 nm;
   wherein an in-plane retardation of the second retardation film is Re2, and an out-of-plane retardation of the second retardation film is Rth2, wherein 8.28 nm≤Re2≤10.12 nm, and 36.36 nm≤Rth2≤44.44 nm;

wherein an in-plane retardation of the third retardation film is Re3, and an out-of-plane retardation of the third retardation film is Rth3, wherein 28.8 nm≤Re3≤35.2 nm, and 126.36 nm≤Rth3≤154.44 nm; and wherein an in-plane retardation of the fourth retardation film is Re4, and an out-of-plane retardation of the fourth retardation film is Rth4, wherein 101.52 nm≤Re4≤124.08 nm, and −86.68 nm≤Rth4≤−70.92 nm.

8. The liquid crystal display panel according to claim 4, wherein an in-plane retardation of the first retardation film is Re1, and an out-of-plane retardation of the first retardation film is Rth1, wherein 8.64 nm≤Re1≤10.56 nm, and 37.89 nm≤Rth1≤46.31 nm;

wherein an in-plane retardation of the second retardation film is Re2, and an out-of-plane retardation of the second retardation film is Rth2, wherein 8.64 nm≤Re2≤10.56 nm, and 37.89 nm≤Rth2≤46.31 nm; and wherein an in-plane retardation of the third retardation film is Re3, and an out-of-plane retardation of the third retardation film is Rth3, wherein Re3=0, and 316.8 nm≤Rth3≤387.2 nm.

9. The liquid crystal display panel according to claim 1, wherein an orientation of the liquid crystal layer is parallel to the absorption axis of the first linear polarizer.

10. The liquid crystal display panel according to claim 9, further comprising a third retardation film disposed between the liquid crystal layer and the second linear polarizer, wherein a slow axis of the third retardation film is perpendicular to the absorption axis of the second linear polarizer.

11. The liquid crystal display panel according to claim 10, further comprising a fourth retardation film disposed between the third retardation film and the liquid crystal layer, wherein a slow axis of the fourth retardation film is parallel to the slow axis of the third retardation film.

12. The liquid crystal display panel according to claim 11, wherein an in-plane retardation of the first retardation film is Re1, and an out-of-plane retardation of the first retardation film is Rth1, wherein 3.6 nm≤Re1≤4.4 nm and 15.84 nm≤Rth1≤19.36 nm;

wherein an in-plane retardation of the second retardation film is Re2, and an out-of-plane retardation of the second retardation film is Rth2, wherein 6.66 nm≤Re2≤8.14 nm, and 29.25 nm≤Rth2≤35.75 nm;

wherein an in-plane retardation of the third retardation film is Re3, and an out-of-plane retardation of the third retardation film is Rth3, wherein 3.6 nm≤Re3≤4.4 nm, and 15.84 nm≤Rth3≤19.36 nm; and wherein an in-plane retardation of the fourth retardation film is Re4, and an out-of-plane retardation of the fourth retardation film is Rth4, wherein 84.15 nm≤Re4≤102.85 nm, and −71.83 nm≤Rth4≤−58.77 nm.

13. The liquid crystal display panel according to claim 11, wherein an in-plane retardation of the first retardation film is Re1, and an out-of-plane retardation of the first retardation film is Rth1, wherein 21.6 nm≤Re1≤26.4 nm, and 94.77 nm≤Rth1≤115.83 nm;

wherein an in-plane retardation of the second retardation film is Re2, and an out-of-plane retardation of the second retardation film is Rth2, wherein 25.2 nm≤Re2≤30.8 nm, and 110.61 nm≤Rth2≤135.19 nm;

wherein an in-plane retardation of the third retardation film is Re3, and an out-of-plane retardation of the third retardation film is Rth3, wherein Re3=0, and 1647.09 nm≤Rth3≤2013.11 nm; and wherein an in-plane retardation of the fourth retardation film is Re4, and an out-of-plane retardation of the fourth retardation film is Rth4, wherein 9.36 nm≤Re4≤11.44 nm, and −5.72 nm≤Rth4≤−4.68 nm.

14. The liquid crystal display panel according to claim 11, wherein an in-plane retardation of the first retardation film is Re1, and an out-of-plane retardation of the first retardation film is Rth1, wherein 3.6 nm≤Re1≤4.4 nm, and 15.84 nm≤Rth1≤19.36 nm;

wherein an in-plane retardation of the second retardation film is Re2, and an out-of-plane retardation of the second retardation film is Rth2, wherein 6.84 nm≤Re2≤8.36 nm, and 29.97 nm≤Rth2≤36.63 nm;

wherein an in-plane retardation of the third retardation film is Re3, and an out-of-plane retardation of the third retardation film is Rth3, wherein 10.8 nm≤Re3≤13.2 nm, and 47.43 nm≤Rth3≤57.97 nm; and wherein an in-plane retardation of the fourth retardation film is Re4, and an out-of-plane retardation of the fourth retardation film is Rth4, wherein 150.84 nm≤Re4≤184.36 nm, and −128.7 nm≤Rth4≤−105.3 nm.

15. The liquid crystal display panel according to claim 10, wherein an in-plane retardation of the first retardation film is Re1, and an out-of-plane retardation of the first retardation film is Rth1, wherein 8.64 nm≤Re1≤10.56 nm, and 37.89 nm≤Rth1≤46.31 nm;

wherein an in-plane retardation of the second retardation film is Re2, and an out-of-plane retardation of the second retardation film is Rth2, wherein 6.84 nm≤Re2≤8.8 nm, and 29.97 nm≤Rth2≤38.61 nm; and wherein an in-plane retardation of the third retardation film is Re3, and an out-of-plane retardation of the third retardation film is Rth3, wherein 132.12 nm≤Rth3≤167.86 nm, and Rth3=0.

16. The liquid crystal display panel according to claim 1, wherein any one or more of the first quarter-wave plate, the second quarter-wave plate, and the first retardation film comprises polymer liquid crystals.

17. The liquid crystal display panel according to claim 1, wherein the first retardation film is disposed between the first substrate and the first linear polarizer.

18. A display device, comprising a liquid crystal display panel, the liquid crystal display panel comprising:
a first substrate;
a second substrate opposite to the first substrate;
a liquid crystal layer disposed between the first substrate and the second substrate;
a first linear polarizer disposed at a side of the first substrate facing away from the liquid crystal layer;
a first quarter-wave plate disposed between the first substrate and the first linear polarizer, wherein an angle between a slow axis of the first quarter-wave plate and an absorption axis of the first linear polarizer is 45° or 135°;
a first retardation film disposed between the liquid crystal layer and the first quarter-wave plate;
a second quarter-wave plate disposed between the liquid crystal layer and the first substrate, wherein a slow axis of the second quarter-wave plate is perpendicular to the slow axis of the first quarter-wave plate;
a second linear polarizer disposed at a side of the second substrate facing away from the liquid crystal layer, wherein an absorption axis of the second linear polarizer is perpendicular to the absorption axis of the first linear polarizer; and a second retardation film disposed between the first quarter-wave plate and the first retardation film, wherein a slow axis of the first retardation film is perpendicular to a slow axis of the second retardation film.

* * * * *